United States Patent
Nirantar et al.

(10) Patent No.: US 10,091,628 B2
(45) Date of Patent: Oct. 2, 2018

(54) MESSAGE BASED APPLICATION STATE AND CARD SHARING METHODS FOR USER DEVICES

(71) Applicant: Samsung Electronics Co., Ltd., Suwon-si, Gyeonggi-do (KR)

(72) Inventors: Abhay Nirantar, Sunnyvale, CA (US); Shravan Sogani, San Ramon, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/394,006

(22) Filed: Dec. 29, 2016

(65) Prior Publication Data
US 2017/0188213 A1    Jun. 29, 2017

Related U.S. Application Data

(60) Provisional application No. 62/272,264, filed on Dec. 29, 2015, provisional application No. 62/272,282, filed on Dec. 29, 2015.

(51) Int. Cl.
*H04Q 7/20*    (2006.01)
*H04W 4/20*    (2018.01)
(Continued)

(52) U.S. Cl.
CPC ............ *H04W 4/20* (2013.01); *H04W 4/003* (2013.01); *H04W 4/14* (2013.01); *H04W 4/60* (2018.02); *H04L 49/355* (2013.01); *H04L 67/146* (2013.01)

(58) Field of Classification Search
CPC .... H04L 49/355; H04L 67/146; H04W 4/003; H04W 4/14; H04W 4/20
(Continued)

(56) References Cited

U.S. PATENT DOCUMENTS

2007/0123280 A1* 5/2007 McGary ................. H04L 51/18
                                                                      455/466
2010/0009702 A1* 1/2010 James ..................... H04W 4/12
                                                                      455/466
(Continued)

FOREIGN PATENT DOCUMENTS

EP         2835952 A1    2/2015

OTHER PUBLICATIONS

International Search Report and Written Opinion for PCT Application No. PCT/US2016/069320, dated Apr. 14, 2017, 23 pages.

*Primary Examiner* — Tan H Trinh
(74) *Attorney, Agent, or Firm* — Jefferson IP Law, LLP

(57) ABSTRACT

A method of sharing a state of an application or a card from a first user device to a second user device is provided. The card is representative of the state. The method includes: receiving, at a processor of the first user device, a user share input; in response to the user share input, determining app state information; generating a data object representative of the state or the card based on the app state information; generating share and destination requests; selecting a share method and a destination link based on responses to the share and destination requests; formatting the data object to generate a message; and transmitting the message to the second user device based on the share method and the destination link. The application is executed on the processor. The transmitting of the message shares the state or the card with the second user device.

18 Claims, 17 Drawing Sheets

(51) Int. Cl.
*H04W 4/00* (2018.01)
*H04W 4/14* (2009.01)
*H04W 4/60* (2018.01)
*H04L 29/08* (2006.01)
*H04L 12/931* (2013.01)

(58) Field of Classification Search
USPC ...... 455/3.01, 456.3, 466, 41.2, 41.1, 456.1,
455/456.2, 420, 414.1; 715/739, 735;
705/41, 39, 21; 704/275; 707/749, 758;
709/217, 204
See application file for complete search history.

(56) References Cited

U.S. PATENT DOCUMENTS

| | | | | |
|---|---|---|---|---|
| 2011/0275358 A1* | 11/2011 | Faenger | ............... | G06F 9/4856 455/420 |
| 2012/0185381 A1* | 7/2012 | Kim | ............... | G06Q 20/10 705/39 |
| 2012/0278722 A1* | 11/2012 | Raleigh | ............... | H04L 12/14 715/735 |
| 2012/0290657 A1* | 11/2012 | Parks | ............... | G06F 9/4856 709/204 |
| 2013/0007499 A1* | 1/2013 | Moy | ............... | G06F 3/1423 713/400 |
| 2013/0144738 A1* | 6/2013 | Qawami | ............... | G06Q 10/02 705/21 |
| 2013/0173759 A1* | 7/2013 | Herse | ............... | G06F 21/34 709/219 |
| 2013/0260739 A1* | 10/2013 | Saino | ............... | G06F 9/547 455/419 |
| 2014/0032706 A1* | 1/2014 | Kuscher | ............... | H04L 67/1095 709/217 |
| 2014/0244786 A1* | 8/2014 | Shapira | ............... | H04L 67/10 709/217 |
| 2014/0289333 A1 | 9/2014 | Chan et al. | | |
| 2015/0111603 A1* | 4/2015 | Rivard | ............... | H04W 4/02 455/456.3 |
| 2015/0227633 A1* | 8/2015 | Shapira | ............... | G06F 17/30395 707/706 |
| 2015/0324605 A1* | 11/2015 | Yoon | ............... | G06F 21/31 726/28 |
| 2016/0072858 A1* | 3/2016 | Heyne | ............... | G06F 3/038 715/753 |
| 2016/0094708 A1* | 3/2016 | Brown | ............... | H04W 68/005 455/414.1 |
| 2016/0219139 A1* | 7/2016 | Choe | ............... | H04M 1/7253 |
| 2016/0219142 A1* | 7/2016 | Brown | ............... | G06Q 30/0241 |
| 2016/0219150 A1* | 7/2016 | Brown | ............... | H04M 3/5235 |
| 2016/0283090 A1* | 9/2016 | Seo | ............... | G06F 3/048 |
| 2016/0357373 A1* | 12/2016 | Greenberg | ............... | G06F 3/1415 |
| 2016/0364765 A1* | 12/2016 | Jiang | ............... | G06Q 30/0271 |
| 2017/0010790 A1* | 1/2017 | Glover | ............... | G09G 5/14 |
| 2017/0041437 A1* | 2/2017 | Singh | ............... | H04L 67/10 |
| 2017/0046024 A1* | 2/2017 | Dascola | ............... | G06F 3/04886 |
| 2017/0185617 A1* | 6/2017 | Nirantar | ............... | G06F 9/547 |
| 2017/0358113 A1* | 12/2017 | Bray | ............... | G06T 11/60 |

\* cited by examiner

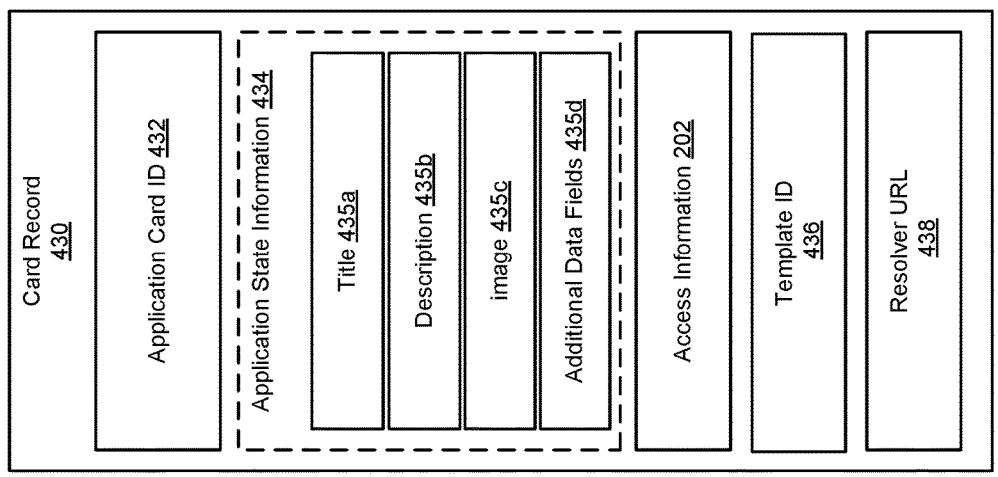

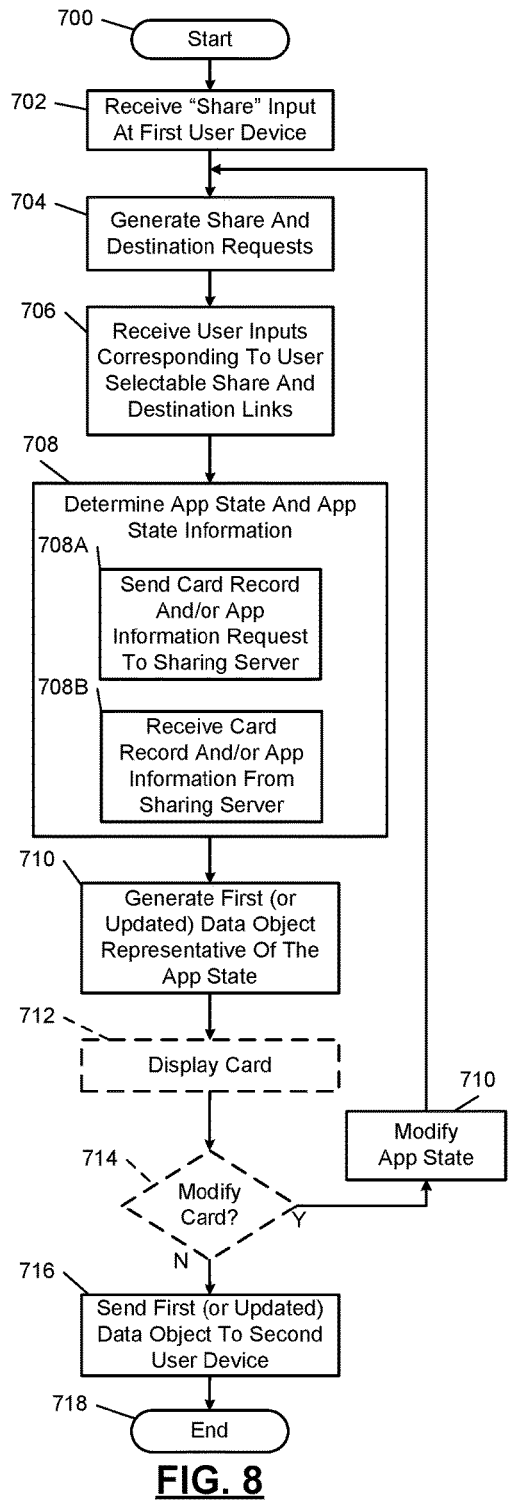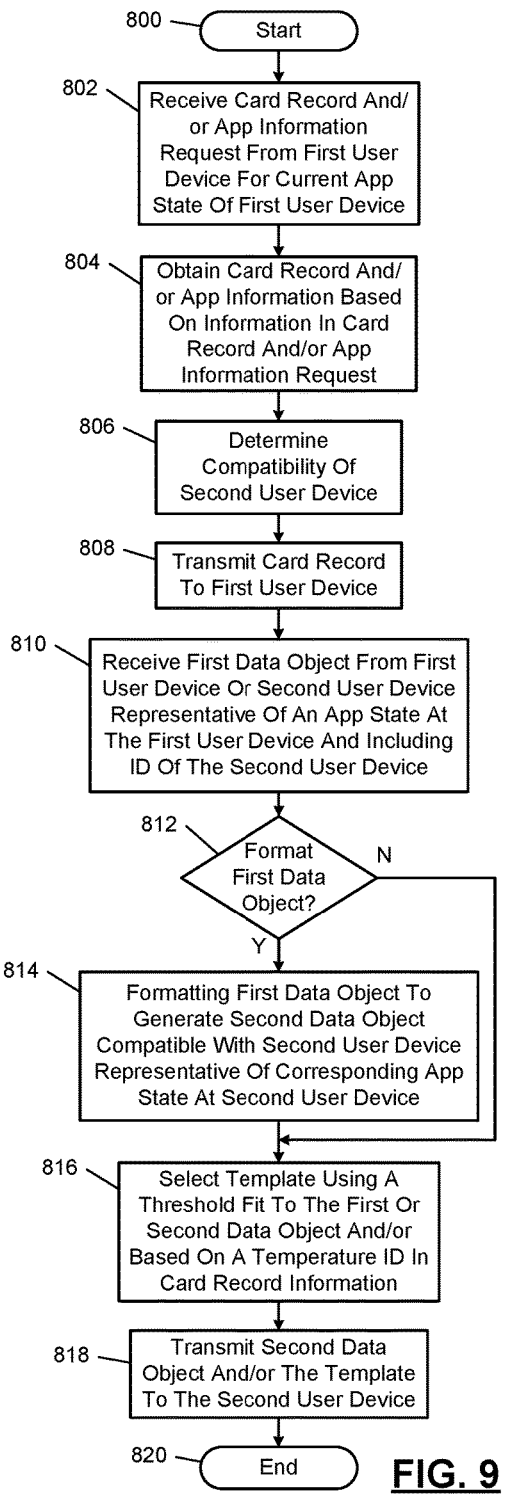
FIG. 8
FIG. 9

MESSAGE BASED APPLICATION STATE AND CARD SHARING METHODS FOR USER DEVICES

CROSS-REFERENCE TO RELATED APPLICATIONS

The present application claims the benefit of U.S. Provisional Application No. 62/272,264, filed on Dec. 29, 2015 and U.S. Provisional Application No. 62/272,282, filed on Dec., 29, 2015. The entire disclosures of the applications referenced above are incorporated herein by reference.

FIELD

This disclosure relates to sharing states of applications.

BACKGROUND

The number of available software applications (referred to herein as "Apps") has grown for user devices, such as computers, smartphones, mobile devices, televisions, in-vehicle computers, and other Internet-connected devices. Many diverse native and web-based software applications are available and can be accessed by the user devices. The applications include business related applications, game applications, educational applications, news applications, shopping applications, messaging applications, media streaming applications, social networking applications, etc. Application developers develop vast amounts of applications within each genre and each application may have numerous editions.

Applications are used to accomplish specific functions and/or tasks. Applications have corresponding application states, which are used to accomplish each task and/or function. As an example, the application states can refer to windows and/or a set of display objects presented to a user to allow the user to accomplish and/or request performance of certain tasks and/or functions. As the number of applications, the complexity of the applications, and/or complexity of corresponding websites increases, it becomes ever more difficult to identify a correct application and/or application state to accomplish a given task and/or function.

SUMMARY

A method of sharing a state of an application from a first user device to a second user device is provided. The method includes: receiving at a processor of the first user device a user input to share the state of the application, where the application is executed on the processor at the first user device; in response to the user input, generating a share request and a destination request; selecting a share method and a destination link based on responses to the share request and the destination request; determining app state information corresponding to the state of the application; and generating via the processor a first data object based on the app state information. The method further includes transmitting the first data object from the processor to a sharing server or the second user device based on the share method and the destination link, wherein the transmitting of the first data object shares the state of the application with the second user device.

In other features, a method is provided and includes: receiving a request from a first user device at a processor of a sharing server for a card record or app information, where the card record and the app information corresponds to a state of an application executed at the first user device, and where the request includes an application card identifier; and accessing card record information for the card record and based on the application card identifier, where the card record information comprises application state information, a template identifier, and access information, and where the card record information has a reference to the application executed on the first user device and indicates an operation for a version of the application to enter the state. The method further includes: sending, in response to the request, the card record information to the first user device; receiving a first data object based on the card record information; selecting a template based on the template identifier of the card record or the first data object; populating the template with at least part of the application state information from the card record; and at least one of transmitting the template to a second user device, or formatting the first data object to generate a second data object and transmitting the second data object from the sharing server to a second user device.

In other features, a method of rendering app state data, corresponding to an app executed at a first user device, at a second user device is provided. The method includes: receiving at a processor of the second user device, a first data object from the first user device, where the first data object represents a state of the app executed on the first user device, and where the first data object comprises an application card identifier; and determining whether to modify the first data object. The method further includes, if the first data object is not modified, requesting a first template for the first data object from a sharing server, and displaying, based on information in the first data object and the first template, the state of the app, a first card corresponding to the state of the app, or app information corresponding to the state of the app. The method further includes, if the first data object is modified: transmitting the first data object to a sharing server; receiving a second data object from the sharing server, where the second data object is a formatted version of the first data object; receiving a second template for the second data object from the sharing server; and displaying, based on information in the second data object and the second template, a state of a second version of the app, a second card corresponding to the state of the second version of the app, or app information corresponding to the state of the second version of the app.

In other features, a method of sharing a state of an application or a card from a first user device to a second user device is provided. The card is representative of the state of the application. The method includes: receiving, at a processor of the first user device, a user input to share the state of the application or the card, where the application is executed on the processor at the first user device; in response to the user input, determining app state information via the processor; generating a data object representative of the state of the application or the card based on the app state information; generating a share request and a destination request; selecting a share method and a destination link based on responses to the share request and the destination request; formatting the data object to generate one or more messages; and transmitting the one or more messages to the second user device based on the share method and the destination link, wherein the transmitting of the one or more messages shares the state of the application or the card with the second user device.

In other features, a method of creating a card representative of a state of an application executed on a first user device and shared with a second user device is provided. The method includes: receiving a hypertext transfer protocol request from a second user device at a sharing server, wherein the hypertext transfer protocol request includes a uniform resource locator; searching for a card record matching the uniform resource locator, a template for rendering the card, and configuration data; populating the template with data from the card record and according to the configuration data; configuring a link for the card; creating the card based on the template and associating the link to the card; and transmitting the card to the second user device.

In other features, a method of rendering application state information or a card, representative of a state of a first application executed on a first user device, at a second user device is provided. The method includes: receiving at a processor of a second user device a first message including a uniform resource locator from a first user device, where the uniform resource locator specifying a server and the state of the first application executed at the first user device; receiving a user input indicating selection of a link for access information or the uniform resource locator; executing a second application that causes the processor to send a request to the server; receiving, from the server in response to the request and via the second application, code for displaying the card or the application state information extracted from the state of the first application; displaying, via the second application, the card or the application state information corresponding to the link; selecting the card or the application state information; and launching, via the processor, the first application at the second user device based on the link, such that the first application executed at the second user device is in the state of the first application as executed on the first user device.

In other features, a method for sharing an application state is provided. The method includes receiving, at a processor of a first user device associated with a first user, a data object from a second user device associated with a second user. The data object represents an application state of an application executable on the second user device. The data object includes a card record associated with the application state and application access information having a reference to the application and indicating a performable operation for the application to enter an operating state providing information from the card record. The method further includes displaying, by the processor, a card in a graphical user interface on a screen of the first user device. The card includes the information from the card record.

Implementations of the disclosure may include one or more of the following optional features. In some implementations, when the card includes a user-selectable link associated with the application access information, the method includes receiving, at the processor, a user selection of the user selectable link and executing, at the processor, the application access information associated with the selected user selectable link. The user selection may include at least one of a voice command, a touch gesture, or a click selection.

When the card includes a user selectable link associated with the application access information, the method may include receiving, at the processor, a user selection of the user selectable link, and displaying, at the processor, a representation of the application state of the application executable on the second user device without executing the application. The method may further include populating a card template with the information from the card record. The card template may be based on at least one of a user device type of the first user device, an operating system of the first user device, a data object type, or a user type. The method may also include sending the data object from the processor of the first user device associated with the first user to a third user device associated with a third user. The data object may include display configuration data.

Another aspect of the disclosure provides a user device for application state sharing. The user device is associated with a first user and includes a screen, a processor in communication with the screen, and a memory in communication with the processor. The memory stores instructions that when executed on the processor cause the processor to perform operations. The operations include receiving a data object from a sharing device associated with a second user. The data object represents an application state of an application executable on the sharing device. The data object includes a card record associated with the application state and application access information having a reference to the application and indicates a performable operation for the application to enter an operating state providing information from the card record. The operations further include displaying a card in a graphical user interface on the screen. The card includes the information from the card record.

This aspect may include one or more of the following optional features. In some examples, the operations further include, when the card includes a user-selectable link associated with the application access information, receiving a user selection of the user selectable link and executing the application access information associated with the selected user selectable link. The user selection may include at least one of a voice command, a touch gesture, or a click selection.

When the card includes a user-selectable link associated with the application access information, the operations may include receiving a user selection of the user selectable link and displaying a representation of the application state of the application executable on the sharing device without executing the application. The operations may further include populating a card template with the information from the card record. The card template may be based on at least one of a user device type of the first user device, an operating system of the first user device, a data object type, or a user type. The operations may further include sending the data object to a receiving user device associated with a third user. The data object may include display configuration data.

Yet another aspect of the disclosure provides a second method for application state sharing. The method includes receiving, at a processor of a sharing server, a first data object from a first user device associated with a first user. The first data object represents an application state of an application executable on the first user device and includes an identification of a second user device associated with a second user. The method further includes determining, by the processor, a compatibility type of the second user device based on the identification of the second user device and sending a second data object from the processor of the sharing server to the second user device. The second data object includes a card record associated with the application state and application access information having a reference to the application and indicating a performable operation for the application to enter an operating state providing information from the card record. The application access information is formatted based on the compatibility type of the second user device.

This aspect may include one or more of the following optional features. Determining the compatibility type of the second user device may include searching a data source for compatibility information based on the identification of the second user device. The data object may be formatted to be displayed as a card.

In some examples, the method includes populating a card template with the information from the card record, the card template based on at least one of a user device type of the first user device, an operating system of the first user device, a data object type, or a user type. The method may further include sending the data object data from the processor to a third user device associated with a third user. The data object may include display configuration data.

Yet another aspect of the disclosure provides another method for application state sharing. The method includes receiving, at a first user device associated with a first user, a first data object from a second user device associated with a second user. The first data object represents an application state of an application executable on the second user device and includes a card record associated with the application state and application access information having a reference to the application and indicating a performable operation for the application to enter an operating state providing information from the card record. The method further includes sending the first data object from the first user device to a sharing server. The sharing server formats the first data object into a second data object compatible with the first user device. The method also includes receiving, at the first user device, the second data from the sharing server and displaying, at first user device, a card in a graphical user interface on a screen of the first user device. The card includes the information from the card record.

In some examples, when the card includes a user-selectable link associated with the application access information, the method includes receiving a user selection of the user-selectable link and executing the application access information associated with the selected user selectable link. The user selection may include one of a voice command, touch gesture, or a click selection.

In some examples, when the card includes a user-selectable link associated with the application access information, the method includes receiving a user selection of the user selectable link and displaying a representation of the application state of the application executable on the second user device without executing the application. The method may further include populating a card template with the information from the card record, the card template based on at least one of a user device type of the first user device, an operating system of the first user device, a data object type, or a user type. The method may also include sending the data object from the first user device associated with the first user to a third user device associated with a third user. The data object may include display configuration data. The details of one or more implementations of the disclosure are set forth in the accompanying drawings and the description below. Other aspects, features, and advantages will be apparent from the description and drawings, and from the claims.

In other features, methods and systems are provided that include receiving, at processor of a first user device associated with a first user, a first message including a uniform resource locator (URL) from a second user device associated with a second user, the URL specifying a web server and an application state of a first application executable at the first user device. The processor receives a selection by the first user of the URL. The processor executes a second application that causes the processor to send a request to the web server. In response to the request, the second application receives, from the web server, code for displaying application state information extracted from the application state. The code further includes a link for accessing the state of the first application. The second application displays the application state information and the link. The first user selects the link and the processor launches the first application using the link such that the first application displays the application state.

BRIEF DESCRIPTION OF THE DRAWINGS

FIG. 4 illustrates an example of a card record in accordance with an embodiment of the present disclosure.

FIG. 8 illustrates an example method of sharing an application state at a first user device with a second user device in accordance with an embodiment of the present disclosure.

FIG. 9 illustrates an example method of providing a card record, a formatted data object and a template from a sharing server to the first user device and the second user device during the methods of FIGS. 8 and 10.

Like reference symbols in the various drawings indicate like elements.

DETAILED DESCRIPTION

Figure 1:
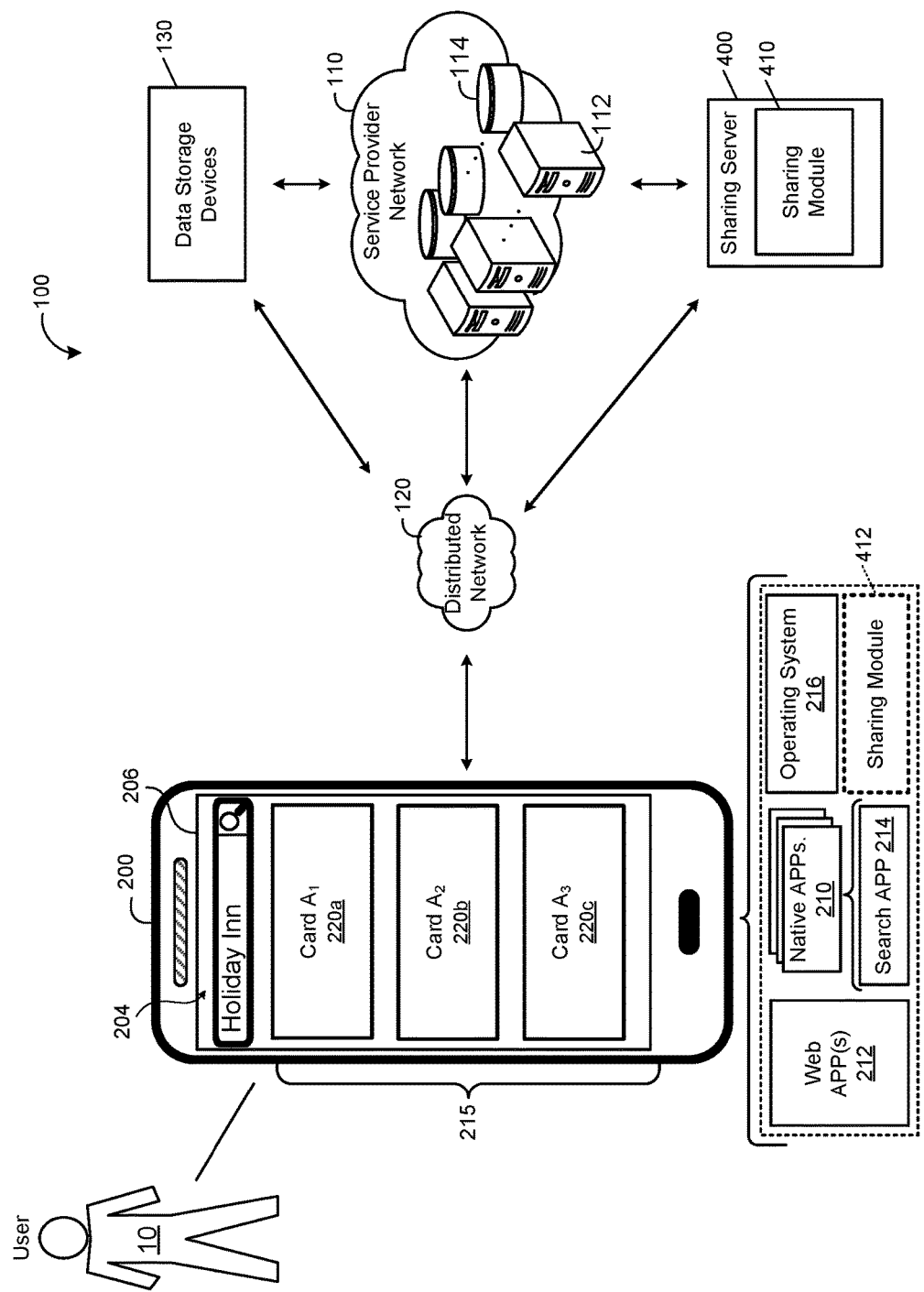
FIG. 1 is a functional block diagram of an example of a sharing server in accordance with an embodiment of the present disclosure.

States of applications may be shared between user devices. For example, a recipe from a recipe application, a story from a news application, or a list of nearby restaurants from a restaurant application may be shared. Users can share web URLs with other users via messaging media associated with the World Wide Web (WWW). Traditional mobile applications are not configured to however allow for convenient sharing of application states. The examples disclosed herein provide systems and methods for conveniently sharing application states, cards representing information about application states, application information, etc. between user devices.

A first user device may send a card to a second user device by creating a data object including information related to a state of an application (referred to herein as an "application state" or "App state") at the first user device. As used herein, a card may refer to a view of an app state or of app state information, which is displayed in another application. The data object may include information from card records retrieved from a sharing server. The information from the card records is used at a second (or receiving) user device to display a card including the information shared by the first user device. The card displayed at the second user device may be static or dynamic depending on the type of information included in the corresponding app state. Some examples of dynamic information, or information that varies by time or location, include local restaurants, taxis nearby, and/or airline flight prices. Some examples of static information are a restaurant's location, a restaurant name, a taxi current location, a movie name, an actor name, an airline flight time, and/or an airline flight departure location. A card may represent a summary of the information included in the application state from which the data object was generated. The second user device may display the card including information corresponding to the application state without opening the application associated with the application state.

As another example, a first (or sending) device may share an app state by generating and transmitting one or more messages including information related to the app state to a second user device. The sending device creates data objects including information about the shared app state and formats the data objects as one or more messages. In some embodiments, the sending user device may generate the data objects using an application that renders the shared application state. For example, a restaurant reviews application may share a state about a particular restaurant from a first user device to a second user device. In other embodiments, the data objects may be generated by another application that displays information about the shared app state. For example, a search application may find search results about states of a restaurant reviews application and share the search results from a first user device to a second user device.

The receiving (or second) user device that receives the messages may display, via a messaging application, the messages including information from the data objects. The information may include a user selectable link for accessing a card representing the shared application state. A card may refer to a view of an app state that is rendered in a different application (e.g., an application search result that is rendered in a search application). A card can be rendered in a native application and/or a web browser application. Upon the user accessing a user selectable link, an application may render a card including a view of the app state. A sharing server may provide additional information necessary to render the card on the receiving user device. The sharing server may include a resolver module that provides compatibility across multiple user devices and platforms and/or serves as an intermediate network device for allowing a first network device to share app states with other user devices. The sharing server stores card records, templates, user records, and configuration data to support rendering of cards. Card records, templates, user records and configuration data are further defined below.

In some examples, a receiving user device displays an application state as a card, which has a user selectable link. Upon the user selecting the user selectable link, the receiving user device opens the same app implemented on a sending user device. The receiving user device sets the app on the receiving user device to the same state that the app is on the sending user device. A data object generated at the sending user device may be formatted by a sharing module to be compatible with the receiving user device. The sharing module may be included in the sending user device and/or a sharing server. The sharing module provides cross-platform formatting and compatibility based on templates and configuration data.

In one example embodiment, a user of a first user device selects a share link associated with a displayed card. In response to selecting the share link, the first user device displays menus respectively for selecting a sharing medium and a second user device. When the user selects a sharing medium that supports sharing of a data object including information associated with the card, the sharing module of the first user device creates and shares the data object. The data object includes a set of data fields (e.g., in JavaScript® Object Notion (JSON) format, hypertext markup language (HTML) format, Javascript® format, etc.) that can be rendered as a card by a sharing module of the second user device. Messaging media supporting sharing of the data object may allow attachment of data object formats. The messaging media may be stored in and/or implemented as part of the sharing module. In one embodiment, the messaging media may include a messaging format implemented by a launcher application for sharing cards displayed by the launcher application.

A sharing module of a first user device may package information associated with a card into a data object and send the data object to a second user device. The data object may include some or all of the information used to display the card at the first user device. In some cases, data tagged as static data may be sent in the data object, while data tagged as dynamic data may be omitted from the data object. In other cases, data tagged as dynamic data may be sent in the data object. Options for packaging information into data objects may be selected based on custom rules, defaults for particular cards, and/or user selections.

Data for displaying a card includes data obtained from a card record, template data, and configuration data. Some or all of this data may be obtained from a sharing server at a remote server. Additionally or alternatively, some of the data may be cached at the first user device. For example, the first user device may maintain a cache of templates and configuration data. A transmitted data object may include some or all of the data obtained from a card record, template data, and/or configuration data. In some embodiments, the minimum data required to include in a data object is a unique identifier of a card record (e.g., an application card identifier, access information, etc.). A sharing module at second user device may retrieve and obtain any other required information from the sharing server. The sharing server may find the other required information by identifying a card record using a unique card record identifier (e.g., application card ID, access information, etc.). The access information facilitates access to the corresponding application state. The access information may include native, web access and/or download information.

The user device may launch (or execute) applications via a uniform resource locator (URL) and according to the access information. The access information may include data that a user device uses to access functionality provided by a corresponding native application. Accordingly, the process of launching the native application and performing functions according to the access information may be referred to herein as launching the native application and setting the native application into a state that is specified by the access information. For example, access information for a restaurant reservation application can include data that causes the user device 200 to launch the restaurant reservation application and assist in making a reservation at a restaurant.

The second user device renders a card associated with the data object using (i) data from the data object generated at the first user device, and (ii) any additional data obtained from the sharing server, a web server, and/or an application programming interface (API). The second user device may use a template and configuration data as well as information from a card record. The card record may be obtained from the data object or the sharing server for rendering the card. The sharing module at the first user device may be a part of a messaging application selected by the first user device or another application that receives the data object from the messaging application. In one example, the sharing module of the second user device is integrated with a launcher application installed at the second user device.

In some cases, the template used by the second user device to render the card may be a different template than a template used by the first user device to render the card. Templates may specify how to render cards using native code of various platforms (e.g., ANDROID®, IOS®, etc.) and/or web formats (e.g., HTML and/or Javascript® formats). Accordingly, when sharing a card across the same or different platforms or between apps with different rendering methods (e.g., web versus native rendering methods), different templates may be used at the first and second user devices.

The different templates may match a same template identifier (ID). The user devices may cache compatible templates locally on each of the user devices and/or additional required templates may be obtained from the sharing server upon request for templates. The request for templates may identify the platform and/or rendering method of the requested template, such that the sharing server may identify and obtain the correct template to return to the requesting user device.

Multiple templates are provided for each platform and rendering method based on card types. For example, templates may include restaurant templates, local business templates, event templates, and generic templates for displaying different types of cards. These different templates are selected to render a card by a template identifier stored in the corresponding card record. In some cases, a particular template may not be available for a chosen platform and/or rendering method. A generic template may be selected by the sharing module or sharing server, such that the card can be displayed by the sharing module. In other examples, the sharing module may obtain and use a best match template instead.

Configuration data maps data from a card record to particular fields of a template. A template populated with data from a card record may be displayed as a card. The template may include instructions for obtaining information to populate fields of the template when the information is missing. Instructions may be in the form of URLs and/or instructions for accessing an API. In some examples, the instructions may include instructions to retrieve the data from a sharing server.

In another example embodiment, the first user device displays an app state that a user is to share with a second user of a second user device. In this embodiment, a sharing module integrated with the application displaying the app state obtains from the sharing server information for creating a data object to send to the second user device. The sharing module may obtain, from the application displaying the app state, information for identifying the card record corresponding to the app state. In some embodiments, the information may be access information associated with the app state, which the sharing server may use to find a card record including the access information. In other embodiments, the information may be keywords and/or text extracted from the app state, along with the name of the application, which may be used to find a matching card record. After retrieving the information for creating the data object, the sharing module creates and sends the data object to the second user device for display on the second user device.

In another example embodiment, the sharing module of the first user device sends the data object to a sharing server along with instructions to share the data object with the second user device. Based on user profiles stored at the sharing module, the sharing server formats a card for display at the second user device and sends the card to the second user device. The sharing server may format the card for display based on: an identified card record; a template matching a card rendering method and/or an operating system of the second user device; and/or configuration data matching the template.

Figure 2:
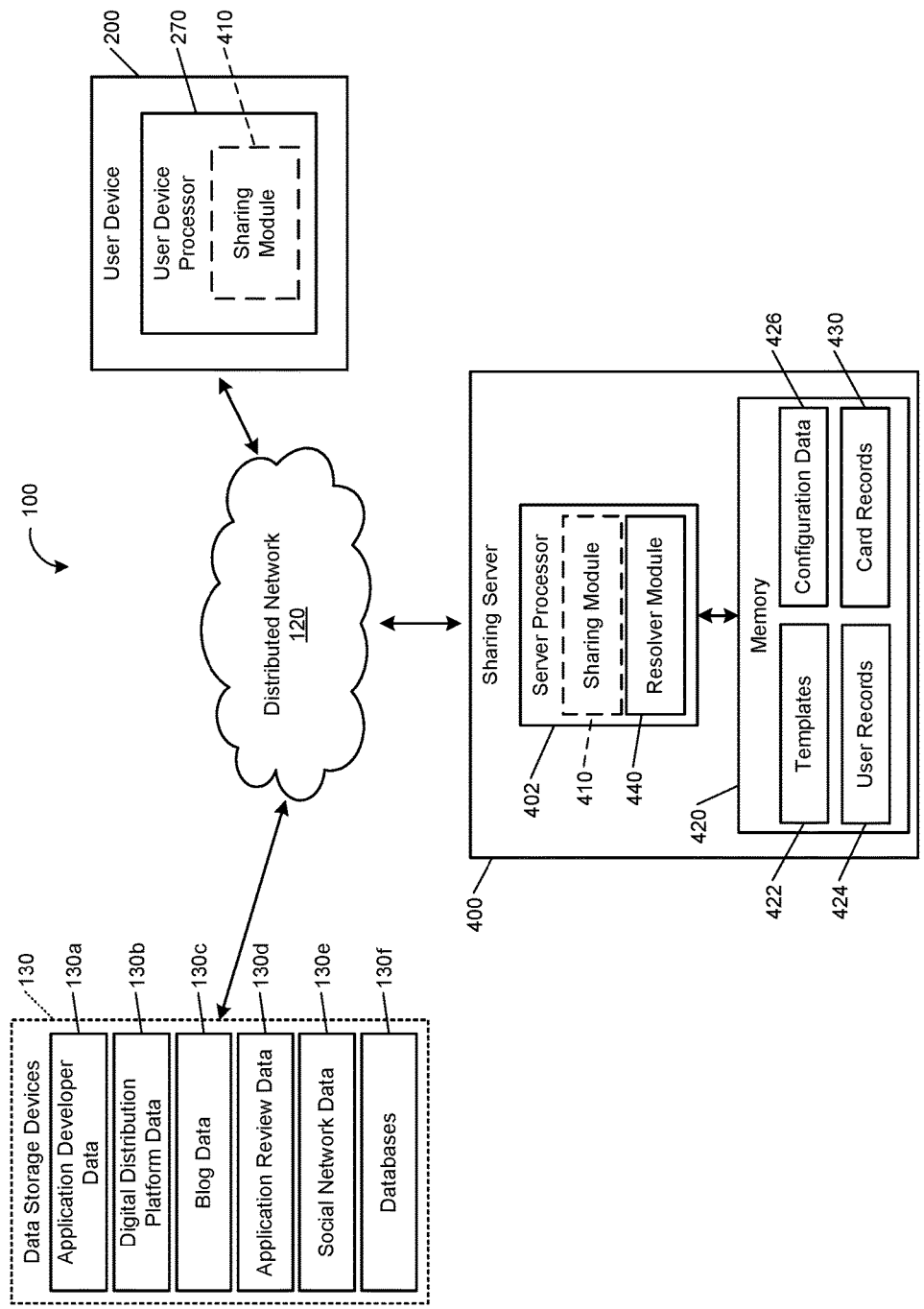
FIG. 2 is a functional block diagram of an example of a portion of the sharing server illustrating a sharing server interacting with a user device and data storage devices in accordance with an embodiment of the present disclosure.

In embodiments where the second user device displays the shared card via a launcher application, the launcher application may dedicate a special screen for displaying cards. The launcher application may store cached templates and configuration data, communicate with the sharing server, and/or share the cards with other user devices. FIGS. 1-2 show a sharing system 100 that includes a user device 200 associated with a user 10 and in communication with a service provider network 110 via a distributed network 120. The service provider network 110 may be a distributed system (e.g., cloud environment) having scalable/elastic computers and/or other remote computing devices 112 and/or storage devices 114. The user device 200, the service provider network 110, and a sharing server 400. The sharing server 400 and/or the user device 200 may implement a sharing module (shown as sharing module 410 in the sharing server 400 and additionally or alternatively as sharing module 412 in user device 200). The sharing module optionally receives data from one or more data storage devices 130 or one or more other user devices 200. In some implementations, the sharing server 400 communicates with the one or more user devices 200 and the data storage devices 130 via the distributed network 120. The distributed network 120 may include various types of networks, such as a local area network (LAN), a wide area network (WAN), and/or the Internet.

The data storage devices 130 may correspond to a variety of different data providers. The data storage devices 130 may include application developer data 130a corresponding to application developers' websites and data feeds provided by developers. The data storage devices 130 may include operator data and digital distribution platform data 130b configured to distribute native applications 210 to user devices 200. As an example this may include digital distribution platform data corresponding to the GOOGLE PLAY® digital distribution platform by Google®, Inc.

The data storage devices 130 may also include other website data associated with websites and web log data 130c (i.e., blog data), application review data 130d, and/or other website data including data related to native applications 210. Additionally, the data storage devices 130 may include social networking data 130e corresponding to social network sites, such as FACEBOOK® by Facebook®, Inc. (e.g., Facebook posts) and TWITTER® by Twitter® Inc. (e.g., text from tweets). Data storage devices 130 may also include online databases 130f that include, but are not limited to, data related to movies, television programs, music, and restaurants. Data storage devices 130 may also include additional types of data sources in addition to the data sources described above. Different data storage devices 130 have corresponding content and data update rates.

A native (or software) application refers to computer software that, when executed by a computing device, causes the computing device to perform a task. In some examples, a native application is referred to as an "application," an "app," or a "program." Example software applications include word processing applications, spreadsheet applications, messaging applications, media streaming applications, social networking applications, and games.

Figure 3A:
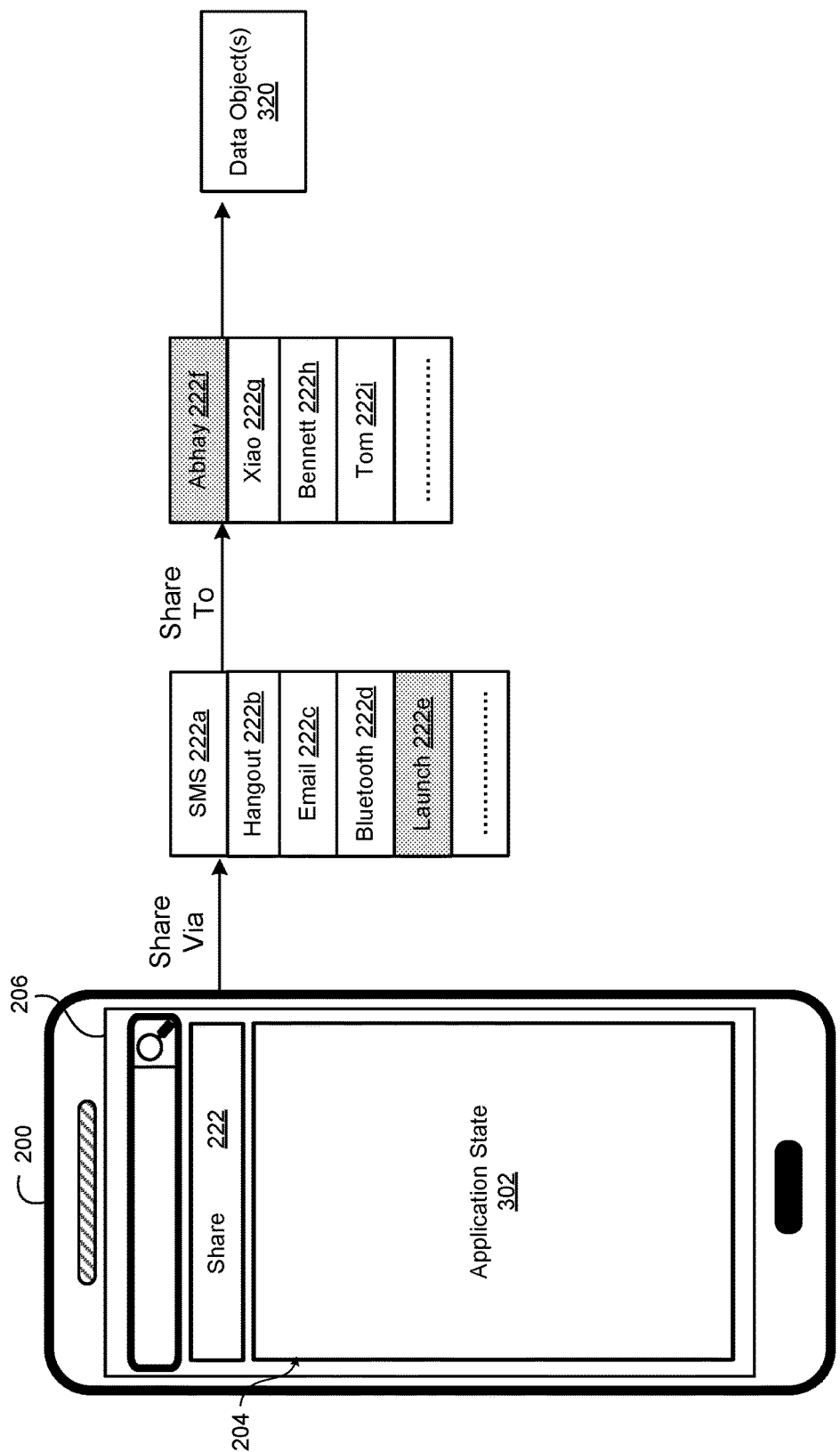
FIG. 3A illustrates an example of the user device and selection and conversion of user selectable links to data objects in accordance with an embodiment of the present disclosure.

Referring now also to FIG. 3A, the user device 200 may be any computing device capable of displaying an application state 302 or card 220 on a display 206 by way of the GUI 204. An application state 302 is a displayed state of an executed application. As an application is executed and a user 10 interacts with the application, each additional interaction places the application in a new resulting application state. Generally, an opening splash screen may not be considered an application state 302, but any state or screen after the splash screen is considered an application state 302. An application state allows for the information included within an application to be used outside the application that created that application state. In addition, a user device processor 270 is capable of executing the one or more installed applications. The user device 200 may be a mobile computing device, such as a laptop, a tablet, a smart phone, and a wearable computing device (e.g., headsets and/or watches). A user device may have other form factors, such as a computing device included in a desktop computer, a vehicle, a gaming device, a television, or other appliance (e.g., a networked home automation device or a home appliance).

The user device 200 includes an operating system 216. In examples where the user device 200 is a mobile device, the user device 200 may run an operating system, such as ANDROID® developed by Google® Inc., IOS® developed by Apple® Inc., or WINDOWS PHONE® developed by Microsoft Corporation. Accordingly, the operating system 216 running on the user device 200 may include, but is not limited to, one of ANDROID®, IOS®, or WINDOWS PHONE®. In an example where a user device 200 is a laptop or desktop computing device, the user device 200 may run an operating system, such as MICROSOFT WINDOWS® by Microsoft Corporation®, MAC OS® by Apple®, Inc., or Linux®. The user device may also access the sharing server 400 while running the operating system 216.

Applications may be executed on a variety of different user devices. In some examples, a native application 210 is installed on a user device prior to a user 10 purchasing the user device. In other examples, the user 10 downloads and installs the native applications 210 on the user device 200.

The functionality of an application may be accessed on the user device on which the application is installed. Additionally or alternatively, the functionality of an application may be accessed via the remote computing devices 112. In some examples, all of an application's functionality is included on the devices 112, 200 on which the application is installed. In other examples, an application installed on a user device 200 accesses information from other remote computing devices 112 during operation. For example, a weather application installed on a user device 200 accesses the latest weather information via the Internet and displays the accessed weather information to the user 10 via the installed weather application. In still other examples, a web-based application 212 (also referred to herein as a web application) is partially executed by the user's computing device and partially executed by one of the remote computing devices 112. For example, a web application may be executed, at least in part, by a web server 332 (shown in FIG. 3C) and accessed by a web browser of the user's computing device. Example web applications may include a web-based email, online auctions, and online retail sites.

The user device 200 may have limited display area on the display 206 to display icons, application states 302 and/or information from other applications. It is desirable to organize application state information into a card 220 presenting the same or similar information. Therefore, when sharing information between applications and users, the sharing server 400 formats the information included in the application state 302 into a card 220 by transmitting the relevant information displayed in the application state 302 using data stored in memory 420 (or sharing data store) of the sharing server 400.

In general, the sharing modules 410, 412 display and/or share application states and cards 220. The user device 200 executes applications that may interface with the sharing module 410. Moreover, the user device 200 may communicate with the sharing server 400 using applications including native applications and browser applications. Although the user device 200 may communicate with the sharing server 400 using a native application and/or a web-browser application, the user device 200 may be described hereinafter as using an application to communicate with the sharing server 400. In some implementations, the functionality attributed to the sharing server 400 or sharing module 410 is included as a display or sharing component of a larger application that has additional functionality. For example, the functionality attributed to the sharing module 410 may be included as part of a native application or a web application as a feature that provides sharing of application states 302 by way of the GUI 204 on the display 206.

As shown in FIG. 2, the sharing server 400 includes the sharing module 410 and a resolver module 440. The resolver module 440 is in communication with the memory 420. The user device 200, sharing server 400, and data storage devices 130 are in communication with each other.

The memory 420 stores information, such as templates 422, user records 424, operating systems of user devices 200, configuration data 426, card records 430 (representing application states), and/or other additional information. The templates 422 include information on how to format a data object 320 into a presentable format across multiple user devices. In some examples, a template 422 is not available for the application state 302 and/or data object 320. In these cases, the sharing module 410 may create a new template based on a similar template 422 and/or access the service provider network 110 and download appropriate template(s). For example, the template 422 may be selected based on a threshold fit of the data object 320 to the template 422. If the data object 320 does match with the template 422 or have a threshold fit, a default template may be selected from a collection of default templates. A template 422 may be selected as the closest approximation of the data object 320 or based on a matching field.

Referring now also to FIG. 4, the matching field may be a title 435a, a description 435b, an image 435c, and/or additional data fields 435d included in the card object 430. In some examples, a data object 320 including an application state 302 from a restaurant is placed in a generic template for a business if a specific restaurant template is not available. A simple template may specify image, title and description, whereas a more complex template may include more specific information and how the information is to be displayed.

The templates 422 include information from card records 430 as a presentable card across multiple user devices. The memory 420 may store templates for different rendering methods. A web template may specify a card in a web format (e.g. HTML and/or Javascript®). Similarly, an ANDROID® template may specify how to render a card on an ANDROID® operating system (e.g., using native ANDROID® code, native ANDROID® widgets, etc.). Moreover, for each rendering method, the memory 420 may store different types of templates for displaying different types of information. For example, memory 420 may store templates for a card displaying information about a restaurant, templates for a card displaying information about an event, templates for a card displaying information about a product, and the like. The card records 430 specify the correct type of template using a template identifier 436. Moreover, a particular template may be selected by the sharing module 410 or resolver module 440 in accordance with a selected rendering method (e.g., web, native, etc.).

The user records 424 may include information regarding the user device 200 that is sharing or receiving the data object 320, such as a user name, a device type, a device operating system, a display size, a display type, installed applications, allowed users, blocked users, preferences, and or other information. The configuration data 426 may include information on how to map the cards 220 or application states 302 into a data object 310 or how to display the data object 310 into cards 220 or application states 302. The configuration data 426 may include information on how to map information from card records 430 into the templates 422 in order to render cards 220. The configuration data 426 may be a binding file that maps fields in the application state information 434 to fields in the template 422. This allows the template 422 to be populated by the proper fields, such as title 435a, description 435b, image 435c, and additional data fields 435. The configuration data 426 may also include formatting data, such as font size/color. In some embodiments, the configuration data 426 is platform-specific, but may be platform-agnostic if a given template 422 uses the same naming conventions across various platforms. The configuration data 426 can be transmitted as part of the data object 320 or downloaded from the memory 420. The combination of information included in the memory 420 allows the sharing module 410 and sharing server 400 to convert and display the relevant information included in a card 220 or application state 302 across multiple user devices 200 and operating systems 216. The sharing server 400 may also provide a connection distributing the shared data object 310 between multiple users 10 in the correct format.

In some implementations, as shown in FIG. 2B, the sharing module 410 is included on the user device 200. The user device 200 may have a particular application state 302 displayed. The user device 200 may request the application card ID 432 or card record 430 from the memory 420 via the sharing module 410 or 412. In some examples, if the user device 200 is sharing the application state 302, the sharing module 410 creates a data object 320 containing the card record 430 or application card ID 432. In at least one embodiment, the user device 200, via the sharing module 410, sends to the memory 420 the current application state 302 and access information 202 and receives the matching card record 430 corresponding to the access information 202. After receiving the application card ID 432, the user device 200 may send the static information to a second user device omitting dynamic information. If the user device 200 is receiving the data object 320, the sharing module 410 may render and display the data object 320 as a card 220. Additional information such as static information or dynamic information may be retrieved using an application program interface (API) to complete the card 220.

In some embodiments, the sharing module 410 may be integrated with a native application of a sending user device. For example, a native application may include the sharing module 410 and a library (e.g., a dynamic library). As part of a native application, the sharing module 410 creates the data object(s) 320 that are sent to a receiving user device as message(s) 224, which is shown in FIGS. 3E, 3F. In some examples, the sharing module 410 may generate data objects 320 for sharing an application state of the native application. In other examples, the sharing module 410 may generate data objects 320 for sharing a card 220 representing a state of a separate application. A user may select a share button 222 for sharing an application state 302 or card 220 in a native application that integrates the sharing module 410. When a user shares a state or card, the sharing module 410 may generate the data objects 320 from information corresponding to the state or card. In some embodiments, the sharing module 410 accesses sharing server 410 to obtain additional information for the data objects 320.

The sharing module 410 formats one or more data objects 320 for transmission to a receiving user device 200b via a messaging medium, for example, via text messages, chat messages, e-mails, and/or the like. The specific format may be selected based on the sharing medium selected by a user. For example, if a user selects share option 222A in order to share via a short messaging service (SMS) message, the messages may be formatted in a SMS format (e.g., plain text, separated into segments of 140 characters or less, etc.). In another example, if a user selects share option 222C in order to share via email, the messages may be formatted in a format that can be rendered via an email application (e.g., using HTML or some other supported markup language). Sharing module 410 may use information selection rules for each sharing medium in order to format the data objects accordingly. Formatting the data objects as messages may involve processing data object information, for example, truncation or concatenation of text fields, formatting URLs as links, resizing images, etc.

FIG. 3A shows the user device 200 and user selectable buttons 222a-i having corresponding links (referred to as user selectable links 222a-i), where i is an integer greater than or equal to 1. In this example, the user device 200 displays an app in a given state referred to as an app state 302. The app state 302 is representative of information displayed to a user and may interact with the user. The links 222a-i may be displayed together with a card 220. Each state of the app may be categorized and/or stored as a card record 430.

As an example, the user selects a user selectable link on the user device 200 by interacting with the link (e.g., touching or clicking the corresponding button). In response to selection of a link 222 (e.g., link corresponding to the "Share" button displayed in the example shown), the user device 200 may launch a corresponding software application (e.g., a native application or a web-browser application). The user may be prompted to provide additional information on how or to whom the app state may be shared. In some examples, the first set of requests to the user includes selecting a messaging medium for how the user wants to share the information. Examples include sharing via share link 222, SMS link 222a, hangout application link 222b, email link 222c, Bluetooth® link 222d, or launcher application link 222e. In this example, the user selects the SMS application link 222a or the launch link 222e. The SMS application link 222a corresponds to an application specifically tailored to share application states for sending SMS messages between multiple user devices 200. The launch app associated with the launch application link 222e may accept a shared app state, a data object, and/or a card record and display a card representative of the information included in the app state, the data object, and/or the card record. The SMS application may accept data from the data object and create messages 224 shown in FIGS. 3E, 3F.

The launch app may also allow a receiving user to select the card (e.g., card 220) and open an application from which the application state 302, data object 320, or card record 430 was generated and shared. The receiving user device of the receiving user may set the application to the same state as the application state 302.

An SMS application may accept data from the data object 320 and create messages 224 therefrom. After selection of a messaging medium for sharing an app state, a user may be prompted by user selectable links 222 to whom the application state 302 is to be shared. Examples include and are shown as Abhay 222f, Xiao 222g, Bennett 222h, and/or Tom 222i. In the example shown, Abhay 222f is selected. The sharing module packages the application state information into a data object 320 including information to recreate the app state 302 on another user device 200. In some examples, information packaged in the data object 320 is based on a tag of the data. Examples of the tag include location, sharable, static, dynamic, and/or other retrievable data via API 330. Given tags may be selected to be included in the data object 320 based on factors, such as server usage, bandwidth, server load, available bandwidth, and/or a number of server requests, etc. The sharing module packages information into data object(s) 320 for formatting as messages 224 to send to receiving user device 200b.

In some examples, the data object 320 is a JSON block of data. The JSON block is a light-weight data interchange format that is suitable for moving data and information between multiple user devices 200. The data object 320 may include the card record 430. The card record 430 is discussed in detail with reference to FIG. 4 below. The app state 302 transmitted using the data object 320 may be either static or dynamic. A static application state displays the same information as the sharing user device 200 on the receiving user device 200.

A dynamic app state may display the same (or similar) state of the application displayed on the sending user device, but the corresponding information displayed is different based on settings in the receiving user device. When the application state is a dynamic application state, the receiving user device may alter the application state based on information from the sending user device. The information may include a location of the receiving user device, an IP address of the receiving user device, a setting of the receiving user device, user inputs, and/or user data. For example, if an application state for restaurants near a location of a user is to be shared, the application state may be shared using different techniques. If the application state is shared as a static application state, then the receiving user device is provided with restaurants near the sending user device. If the application state is shared as a dynamic application state, then the receiving user device is provided with restaurants near the receiving user device and not the sending (or sharing) user device.

As an additional example, if an application state for taxis near the sending user device is to be shared statically, the application state on the receiving user device shows taxis near the sending user device. If the application state is shared dynamically, the receiving user device may see taxis near the receiving user device and not near the sharing user device. In some examples, only parts of an application state are shared statically and other parts are shared dynamically. Using the example of a sharing user device sharing the application state of a list of restaurants near the sharing user device, the application state may include a list of restaurants within a given distance of the sharing user device and a distance from the sharing user device to each of the restaurants. The receiving user device may receive an application state displaying the list of restaurants statically and the distances to the restaurants dynamically. As a result, the receiving user device displays (i) a list of restaurants near the sharing user device that was shared statically, and (ii) the distances from the receiving user device to each of the restaurants.

Figure 3B:
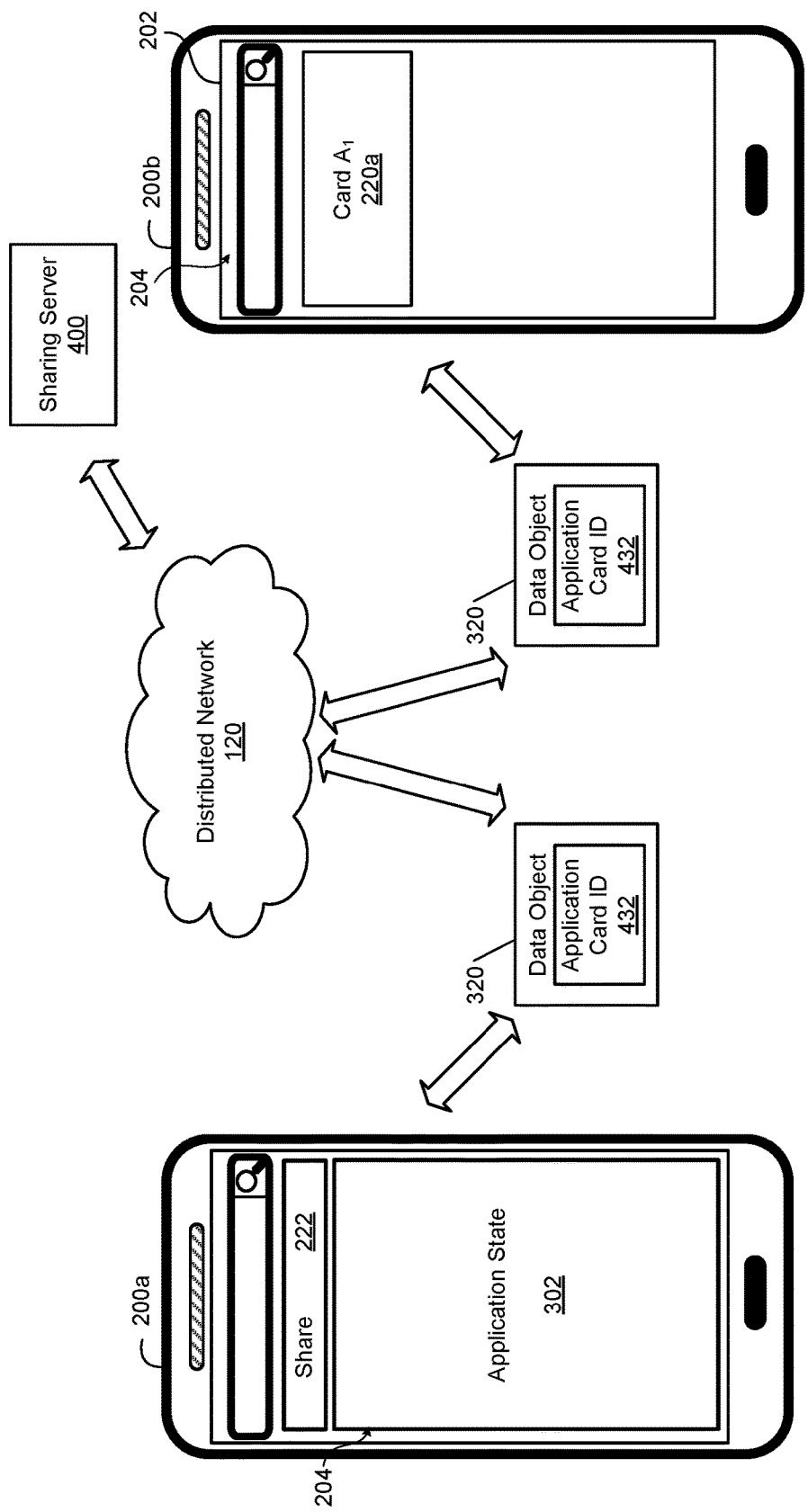
FIG. 3B illustrates an example of a first user device sharing an application state displayed as a card on a second user device in accordance with an embodiment of the present disclosure.

FIG. 3B shows a user device 200a sharing an application state 302, which is displayed as a card 220 on a receiving user device 200b. The sharing user device 200a has initiated a user selectable link 222 requesting to share the contents of the application state 302 to the receiving user device 200b. The sharing user device 200a may send a data object 320 related to the application state 302 via the distributed network 120 to access the sharing server 400 and retrieve a card record 430 from the sharing server 400. The data object 320 may include the information related to the application state 302. The receiving user device 200b receives the data object 320 through the distributed network 120 and displays the information included in the data object 320 in the card 220. In at least one example, the data object 320 includes application card ID 432. Using the application card ID 432 in the data object 320, the sharing server 400 may populate the remainder of information used to display the card 220 on the receiving user device 200b. In some examples, the receiving user device 200b receives the data object 320 including the application card ID 432 and requests any additional information from the sharing server 400 using the distributed network 120 to populate the card 220.

The card 220 may be a graphical representation of the actual data in the application state 302 or a text format presenting similar or reduced information shown in the application state 302. The card 220 may include a user selectable link that when selected causes the same app to be opened as the app corresponding to the application state 302. The app executed on the receiving user device 200b is set to the same state as the app state 302. In some examples, the user selectable link of the card 220 when selected causes a display app to open that displays a full screen version of the application state 302 without requiring the user to have the same app installed that generated the application state 302 and resulting data object 320. In some examples, the user selectable link of the card 220 prompts the user to agree to having the app that generated the application state 302 installed. Upon installation of the app, the app is opened to the same state as the application state 302.

The data object 320 generated by the sharing user device 200a may be sent via the distributed network 120 to a sharing server 400. The sharing server 400 may reformat the data object 320 into a suitable format depending on the receiving user device 200b, such as when the receiving user device 200b is unable to interpret or display the information included in the data object 320 from the card 220. The receiving user device 200b may also (i) send the received data object 320 back to the sharing server 400 for reformatting to be appropriate for the operating system of the receiving user device 200b, and/or (ii) request a template 422 that is appropriate to display the data object 320.

Figure 3C:
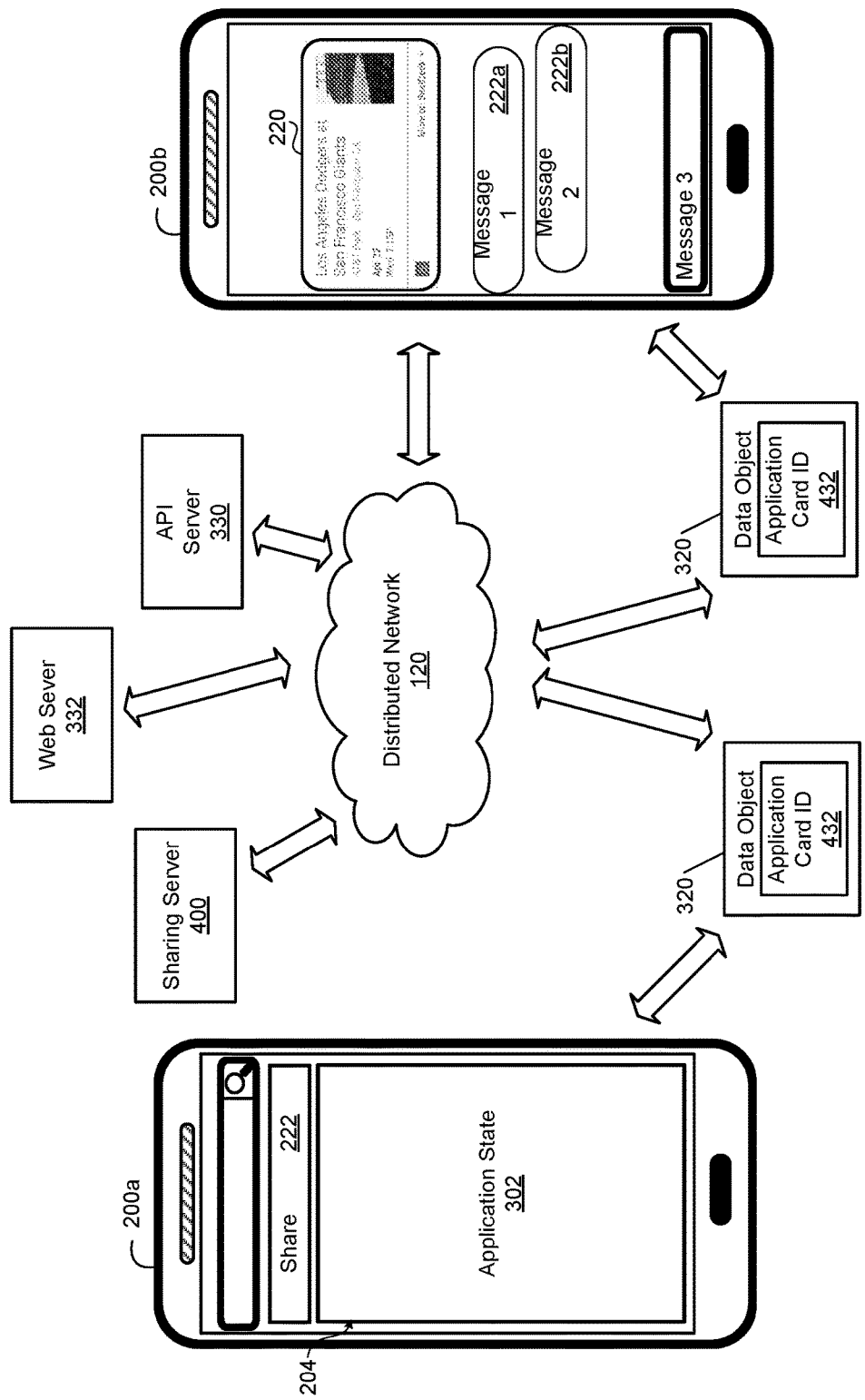
FIG. 3C illustrates another example of a first user device sharing an application state displayed as a card on a second user device in accordance with an embodiment of the present disclosure.

FIG. 3C shows the user device 200a sharing an application state 302 and displaying the app state as a card 220 on the user device 200b. The sharing user device 200a may send a data object 320 including the information from the application state 302 to the receiving user device 200b via the distributed network 120. The receiving user device 200b receives the data object 320 and converts the data object 320 into a card 220, which includes at least one of the same information presented in the application state 302. In some examples, the card 220 is presented inside of a messaging application. An application on the second user device 200b may display additional messages or user selectable links 222, 222a,b in addition to the card 220. The first message or user selectable link 222a may be from the first user device 200a. The second message or user selectable link 222b may be generated by the second user device 200b and sent to the first user device 200a. The card 220, messages and/or user selectable links 222, 222a,b may be from different and or multiple user devices. The sending user device 200a and/or the receiving user device 200b may be integrated with a software development kit (SDK) 444 including API 446, which are shown as being stored in the memory 280 in FIG. 5. The API 446 expresses a software component in terms of its functionality, operations, data type, various inputs and outputs. The API 446 may communicate with and/or obtain software, information and/or data from the API server 330. If the receiving user device 200b is operating an application integrated with the SDK 444 and a correct API, the application may display the card 220 related to the application state 302 of the sharing user device 200a included in the data object 320. The application may choose to integrate the card 220 as a user selectable link 222 and integrate with additional software included in the application, such as search and/or messaging software.

In one example, the user selectable links 222a-d are messages shared from the sharing user device 200a or an additional third user device 200. The cards 220 are displayed in a similar format as the user selectable link messages and allow the user to select the card 220. Upon the user selecting the card 220, the application may open a similar application as the one sent in the data object 320 and set the application to the same state as specified in the data object 320. Additionally, the SDK 444 and API 446 may include the necessary information to display, render or interpret the data object 320 on the GUI 204 of the application into a card 220 with a user selectable link 222.

In some implementations, the data object 320 includes the application card ID 432. The data object 320 is sent to the receiving user device 200b. The receiving user device 200b requests additional information from the sharing server 400 related to the application card ID 432, such as configuration data 426, template data 422, other information included within the card record 430, etc. The receiving user device 200b may request additional information from the API 446 and/or the API server 330. The API 446 may access web server 332. The web server 332 may provide additional information to the receiving user device 200b in order to populate the card 220. In some examples, the data object 320 includes the application card ID 432 and/or other information that is sent to the sharing server 400. The sharing server 400 returns a partial or complete card record 430 and optionally includes the template(s) 422, user records 424, and/or configuration data 426.

Figure 3D:
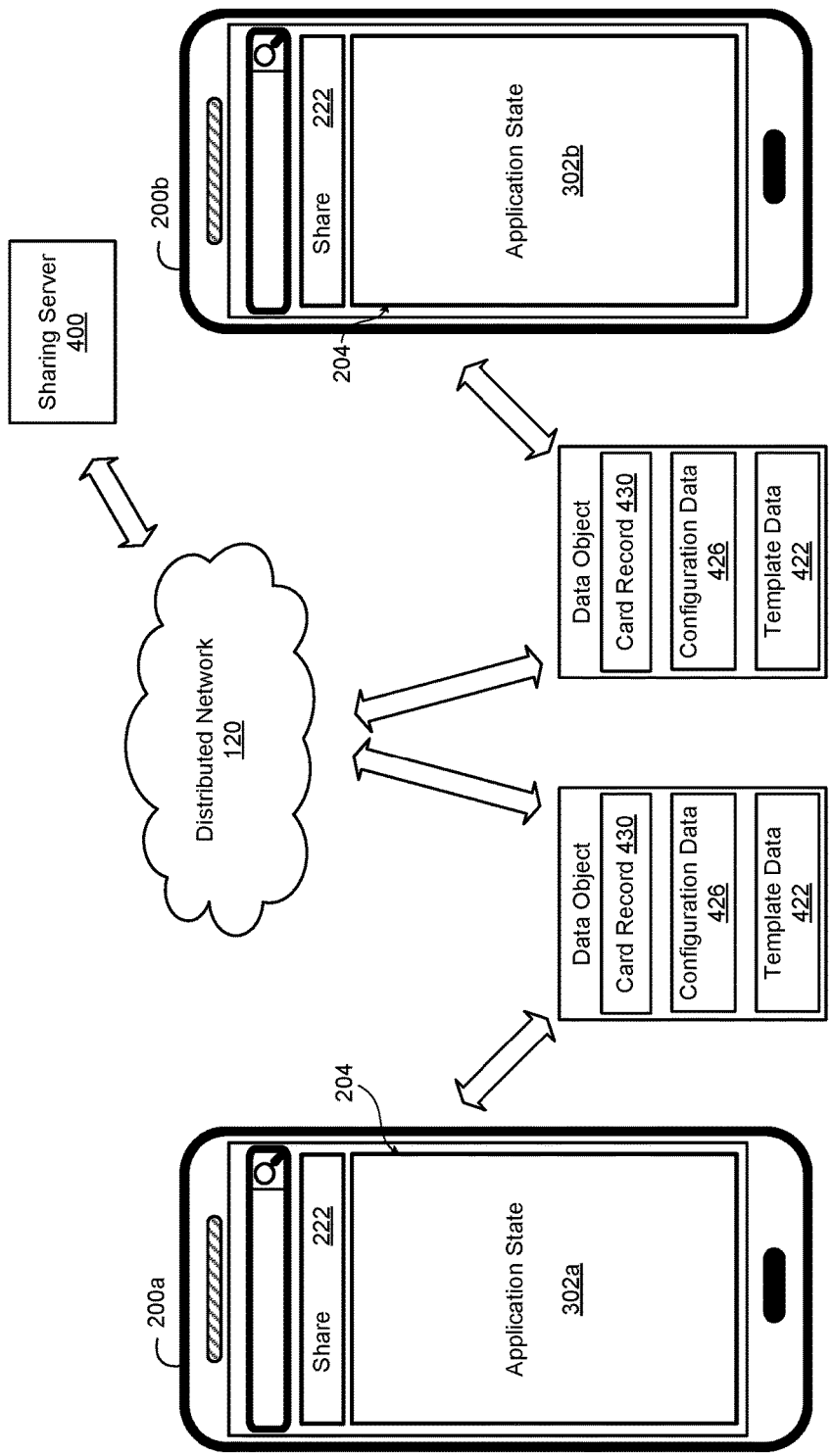
FIG. 3D illustrates an example of a first user device sharing a first application state to a second user device, which is displayed as a second application state in accordance with an embodiment of the present disclosure.
Figure 3E:
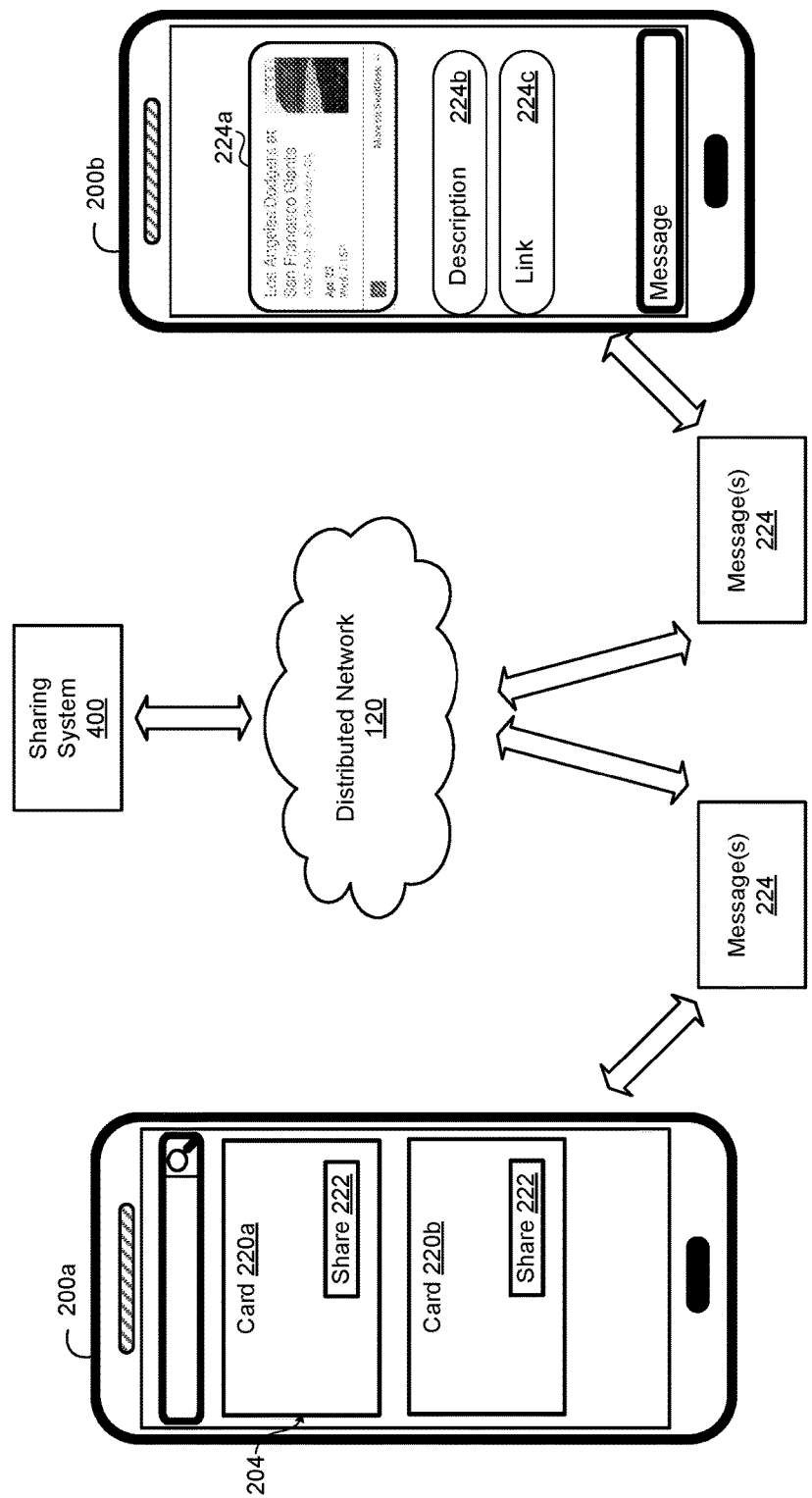
FIG. 3E illustrates an example of user devices sharing a card representing an application state in accordance with an embodiment of the present disclosure.
Figure 3F:
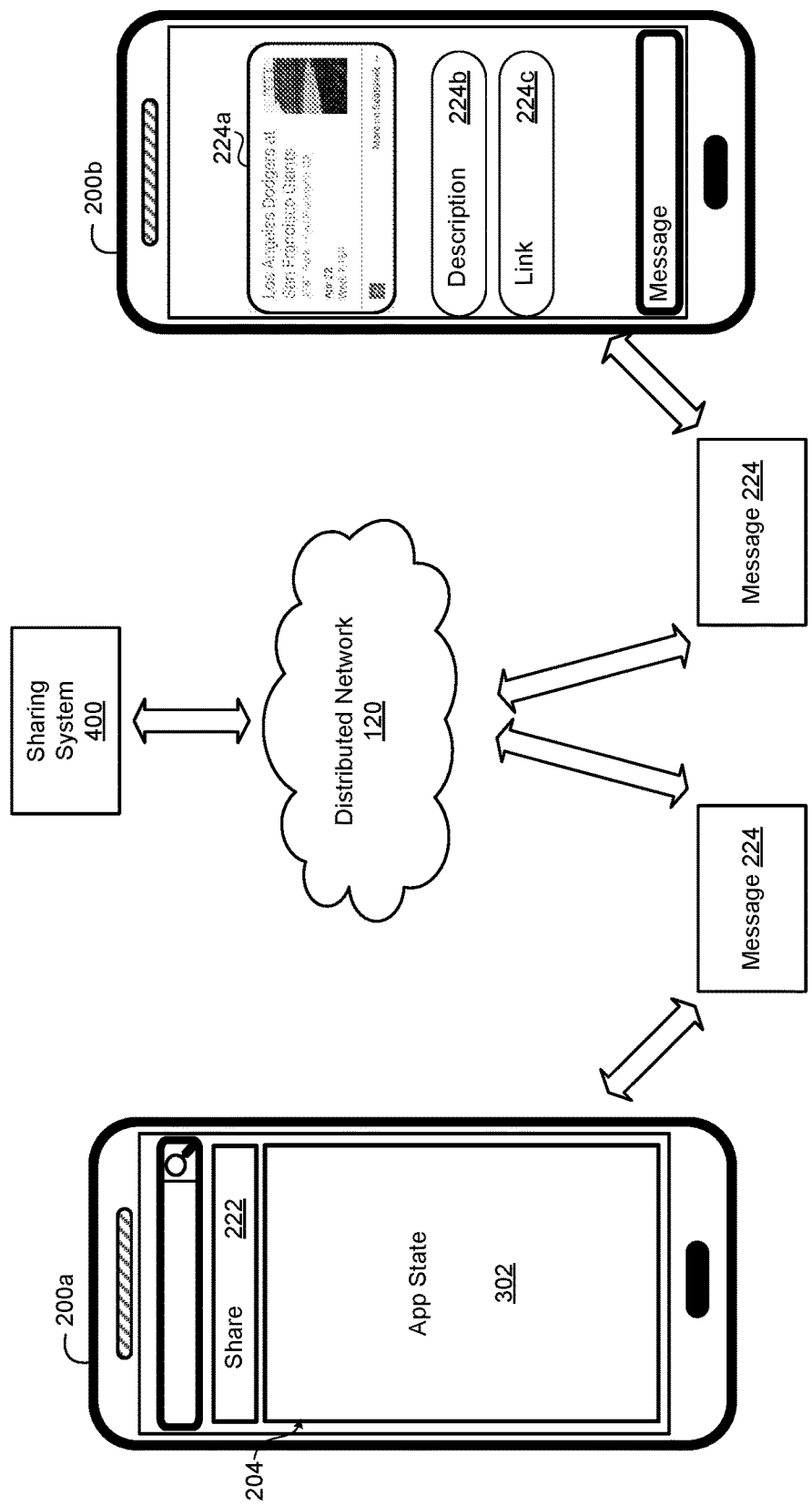
FIG. 3F illustrates an example of a user device sharing an application state in accordance with an embodiment of the present disclosure.

FIG. 3D illustrates an example first user device 200a sharing a first application state 302a to a second user device 200b displayed as a second application state 302b. Upon the user 10 selecting the user selectable link 222 "share", the first user device 200a packages information regarding the application state 302 into the data object 320. The data object 320 is transmitted via the distributed network 120 to the sharing server 400. The sharing server 400 processes the data object 320 to determine the desired second user device 200b. The sharing server 400 compares the information in the data object 320 to the operating system or type of device of the second user device 200b. This information may be stored in the memory 420 or requested from the second user device 200b via the distributed network 120.

The sharing server 400 may then convert the data object 320 into the proper format or template 422 that is readable by the second user device 200b. The second user device 200b may display the first application state 302a as a second application state 302b or as a card 220 including the same information as the first application state 302a. The second user device 200b may also display the second application state 302b if the second user device 200b does not have the application that created the first application state 302a installed on the second user device 200b. If the second user device 200b does not have the application that created the first application state 302a, the user of the second user device 200b may be prompted to install the application. In some examples, the data object 320 includes some of the data to populate the template(s) 422. The remainder of the template(s) 422 is populated from template data. The template data may be retrieved from the distributed network 120 or from the sharing server 400. The template data may include static or dynamic object data or other object data, such as image data, description data, format data, graphic data, media data, and/or audio data, etc.

When receiving a data object 320, the second user device 200b may compare the included data in the data object 320 to a template 422 and request any additional data to complete the template 422 from the sharing server 400, a third party server, or from internal memory. The additional data may be referred to as template data. In some examples, template data is received from multiple sources by the second user device 200b. The template data may be used to populate or complete a card 220. In some examples, the template data 220 is sent from the sharing device 200a and stored on a server and/or the sharing server 400 until the template data 220 is requested to populate a template. The template data may be kept on the server and/or sharing server 400 and be used repeatedly without additional uploads.

In some implementations, a memory of the sharing user device 200*a* stores the card record 430, configuration data 426, and/or template data 422. The sharing user device 200*a* may include the data to render the card 220 and/or the application state 302. The card record 430 may include the application card ID 432, the application state information 434, access information 202, and the template ID 436. The sharing user device 200*a* may select the data to populate the card record 430 based on information that may be obtained from the API server 330 or web server 332. In some implementations, the data provided by the sharing user device 200*a* is adequate to render the card 220 and prevents the receiving user device 200*b* from having to access the sharing server 400 to display the card 220. The sharing user device 200*b* may optionally contact the sharing server 400 or API server 330 to verify and/or collect additional information required to render the card 220. In some embodiments, as shown at FIG. 3B, users may select a share link 222 associated with a card 220. In these embodiments, the sharing module 410 may embed application state information 434 associated with the card 220 into one or more data objects 320. The sharing module 410 may format data objects 320 for sending in one or more messages 224 based on the selected messaging medium.

For example, the sharing module 410 may send description data 435*b* to another user as a text message. Additionally or alternatively, the sharing module may embed image data 435*c* in another message, such as an image message. The sharing module 410 may also embed a resolver URL 438 in a text message. The resolver URL 438 can be included within the message including description data 435, in a separate message, or in a message together with some other information. The sharing module 410 may use tags associated with application state information 434 in order to select information for a particular data object. For example, the card 220 may include image data 435*c* tagged as an "image," description data 435*b* tagged as a "description," a resolver URL 438 tagged as a "resolver URL," etc. The sharing module 410 may select information associated with particular tags for packaging as data object(s) and share the information according to information selection rules. If the sharing module 410 needs additional information beyond the data associated with the card 220, the sharing module 410 may send a request to the resolver module 440 identifying the card record 430 (e.g., using the application card ID 432 and/or resolver URL 438) and the corresponding data fields. The resolver module 440 finds the matching card record 430, extracts the requested data, and returns the matching card record 430 to the sharing module 410.

When the data objects 320 are sent as messages 224, the data objects 320 may be arranged in one or more messages. In one example, as illustrated by FIG. 3E, the sharing module 410 may cause the sending user device 200*a* to transmit an image message first, followed by a description message, and concluding with a message including the resolver URL 438 formatted as a link. In another example, a first message may include an image and a second message may include a description concatenated with a resolver URL 438 formatted as a link.

In other embodiments, as shown at FIG. 3C, users may select a share link 222 associated with an application state 302. The integrated sharing module 410 may display a share link 222 in order to share a state of the application. In some examples, the sharing module 410 causes the share link 222 to be displayed separate from the rest of the application state (e.g., adjacent to the application state 302, hovering over the application state 302, etc.). In other examples, the sharing module 410 causes the share link 222 to be displayed within the application state 302, for example, by injecting code for rendering the share link 22 into the rendering code for the application state.

In these embodiments, the sharing module 410 may generate data objects 320 from information obtained from the rendered application state 302. For example, the sharing module 410 may capture a screenshot of all or a portion of the application state 302 in order to send the captured screenshot as an image message. The sharing module 410 may request additional information from the sharing server 400. The sharing server 400 (in particular resolver module 440) may receive the request and find a card record 430 that matches the application state 302 from the memory 420 based on a query provided by the sharing module 410.

When accessing additional information about a state from the sharing server 400, the sharing module 410 creates a query comprising information associated with the rendered application state. For example, the sharing module 410 may embed a name of the application in the query. Furthermore, the sharing module 410 may extract keywords and/or text from particular fields of the rendered application state to embed in the query. The resolver module 440 may then find the matching card record 430. The sharing server 400 responds with information from a matching card record 430 in response to the query (e.g., a resolver URL 438, a description 435*b*, and/or an image 435*c*).

The resolver module 440 may provide application state information 434 from a card record 430 to the sharing module 410. In some embodiments, the resolver module 440 may provide the whole card record 430. In other embodiments, the sharing module 410 may specify which information resolver module 440 should extract and return. Additionally, the resolver module 440 may provide the resolver URL 438 that directs back to the resolver module 440. The resolver module 440 may run a web server, such that user devices may access the resolver module 440 via a web browser application using the resolver URL 438.

Figure 3G:
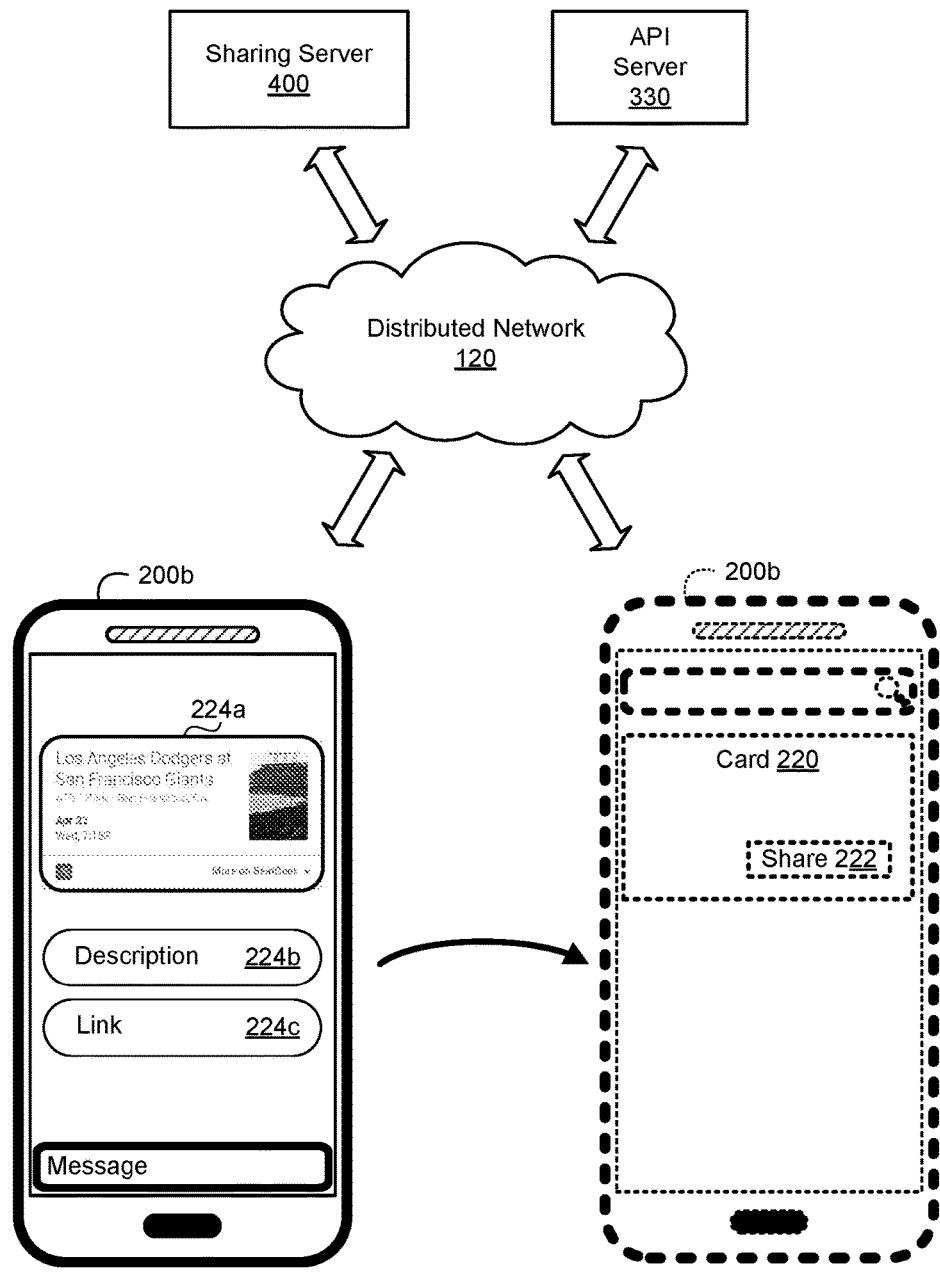
FIG. 3G illustrates an example of a user device accessing a card representing a shared application state in accordance with an embodiment of the present disclosure.

FIG. 3G shows selection of a link including the resolver URL 438 at the receiving device 200*b*. A user of the receiving 200*b* may select the link including resolver URL 438 embedded in the received message 224 by selecting or clicking a card or button (e.g., card 224*a*, buttons 224*b*, 224*c*) corresponding to the message 224 including the resolver URL 438. Selecting the resolver URL 438 may cause the receiving device 200*b* to check a URL handler module 448 to select which application should receive the resolver URL 438.

The URL handler module 448 (e.g., a custom URL handler module on IOS® or an intent filter on ANDROID® operating systems) specifies which application should intercept and handle a URL that meets a predefined pattern. By default, URLs that start with the string "http://www" may be handled by a web browser. In one embodiment, other URL handler modules may override a default handler module (e.g., the URL handler module 448) if a URL matches a more specific pattern (e.g., the URL includes a specified domain name such as "quixey.io").

When the sharing module 410 is not installed at a user device, the resolver URL 438 may be handled by the web browser application 211. Accordingly, when a user selects a message or link including the received resolver URL 438, the web browser application 211 intercepts and handles the resolver URL 438. In particular, the web browser application 211 of the receiving user device 200b may access the web server 332 specified by resolver URL 438, which is running on sharing server 400.

The resolver module 440 detects that the web browser application 211 has requested a webpage corresponding to the resolver URL 438. Accordingly, resolver module 440 may generate a web page including the card 220 and transmit the card 220 to the receiving user device 200b. The resolver module 440 generates the web page by: finding the card record 430 matching the resolver URL 438; selecting a template 422 matching the template identifier 436 of the card record 430 and selected rendering method; and retrieving configuration data 426 for the selected template 422. In this example, the template 422 is a web card template. In particular, the resolver module 440 populates the matching web card template 422 with application state information 434 as specified by the configuration data 426. For example, the configuration data 426 may indicate that a data field of the template tagged as an "image" should be populated with image data 435c.

In some cases, if the card record 430 includes web access information 202, the resolver module 440 may associate the web access information 202 with a link field of the template 422; such that a user clicking on a link embedded within the card 220 can access a web page corresponding to the shared application state 302. In other cases, the resolver module 440 may select application access information that works with the operating system of the receiving user device 200b based on the user agent string received from the web browser application 211. A user agent string is a string provided with a hypertext transfer protocol (HTTP) request by the web browser applications 211 for identifying the requesting user device. For example, a user agent string of "Mozilla/5.0 (iPad; CPU OS 7_0 like Mac OS X) AppleWebKit/537.51.1 (KHTML, like Gecko) CriOS/30.0.1599.12 Mobile/11A465 Safari/8536.25 (3B92C18B-D9DE-4CB7-A02A-22FD2AF17C8F)" may indicate that the receiving user device 200b is an IOS® device. Accordingly, in some embodiments, the resolver module 440 may populate the template 422 with application access information specific to the operating system of the receiving user device 200b.

The resolver module 440 embeds the populated template 422 as a card 220 in a webpage. The webpage may be returned to the browser and rendered at the receiving user device 200b. A user of the receiving user device 200b may select a link associated with the card 220 to access the embedded (web or application) access information 202.

When the sharing module 410 is installed at the receiving user device 200b, additional software may be activated. If a user selects a link including the resolver URL 438 (e.g., clicks on the button corresponding to the message 224 and including the resolver URL 438 formatted as a link), the sharing module 410 may cause the card 220 to be rendered by an integrated native application. For example, the sharing module 410 installed as part of a launcher application may cause the card 220 to be rendered in a special window of the launcher application. In other examples, the sharing module 410 installed in an application for searching and finding other applications may render the card 220.

The sharing module 410 may register a handler module that designates the domain name of the resolver URL 438. Accordingly, in one example, the native application integrated with the sharing module 410 may intercept the selected resolver URL 438 when a user of the receiving user device 200b selects the resolver URL 438 from the messaging application. For example, a launcher application may intercept the resolver URL 438 and provide the resolver URL 438 to the embedded sharing module 410.

The sharing module 410 at the receiving user device 200b communicates with the sharing server 400 in order to render the card 220. The sharing module 410 sends a query including the resolver URL 438 to the sharing server 400. Moreover, the sharing module 410, in an example, may embed in the query information: the operating system of the received user device 200b; whether an application pertaining to the application state 302 is installed; and a selected rendering method. The selected rendering method may also indicate whether the application is to render the card 220 using a native operating system code or a web code.

In some embodiments, the sharing module 410 may detect whether an application is installed by matching a parameter of the resolver URL 438 to a list of installed applications. For example, a resolver URL indicating an example restaurant state may be http://quixey.io/RestaurantApp/ViewRestaurantById/12345. In this example, "RestaurantApp" is the name of the restaurant. The sharing module 410 may detect whether the RestaurantApp is installed by extracting the application name parameter from the resolver URL 438 and comparing the application name parameter to a list of installed applications provided by the operating system of the receiving user device 200b.

The resolver module 440 may: locate the card record that matches the resolver URL 438; locate a template 422 matching the template identifier 436 of card record 430; determine the selected rendering method; and locate configuration data matching the template 422. The resolver module 440 generates the card 220 by populating the template 422 with application state information 434 according to configuration data 426. The resolver module 440 may select particular access information 202 based on the indication from the sharing module 410 of whether a corresponding application is installed. For example, if the application specified by the card record 430 is not installed, the resolver module 440 may select access information 202. If the application specified by the card record 430 is installed, the resolver module 440 may select access information for the specified operating system. The resolver module 440 returns the populated template 422 as the card 220 for rendering at the received user device 200b.

In some implementations, the receiving user device 200b may request additional information from an API server 330 in order to finish populating the card 220. The template 422 may include instructions for the sharing module 410 to access the API 446 and finish populating the card 220. The instructions may access an API server 330 or local files. The API server 330 may provide additional information to the receiving user device 200b in order to populate the card 220.

FIG. 4 shows the card record 430 that is based on an app state. The card record 430 includes data related to a state of the app. The card record 430 may include an application card identifier (ID) 432, application state information 434, a template identifier 436, and access information 202 used to provide features provided by an application.

Figure 6:
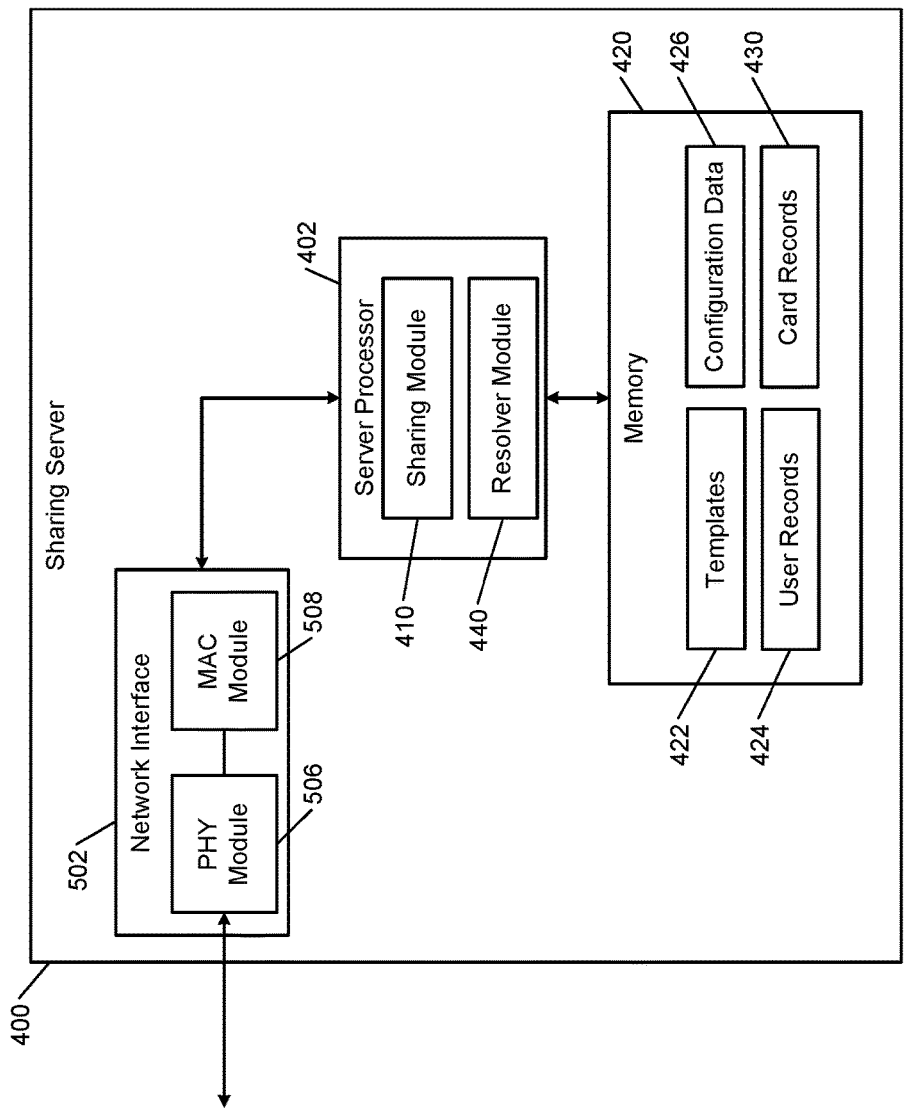
FIG. 6 is a functional block diagram of an example of a sharing server in accordance with an embodiment of the present disclosure.

The application card ID 432 may be used to identify the card record 430 and may be a string of alphabetic, numeric, and/or symbolic characters (e.g., punctuation marks) that provides a unique ID that distinguishes the card record 430 from other card records stored in the memory 420 (shown in FIG. 6). In some examples, the application card ID 432 describes a function and/or an application state in human readable form. For example, the application card ID 432 includes the name of the application referenced in the access information 202. In a specific example, an application card ID 432 includes the name of an Internet music player application and a song name. The song associated with the song name is played when the Internet music player application is set into the state defined by the application access information included in the application state.

In some examples, the application card ID 432 includes a string in the format of a URL, which may uniquely identify the card record 430. In some examples, the string includes multiple parameters used to retrieve the corresponding card record 430. In addition, some parameters may be user-generated, which results in creation of a new card record that includes the parameters and has a corresponding application that has not been previously executed. Thus, the user-selectable link 222 may not explicitly correspond to a known end result inside the application, but simply fits a known link expression that the application accepts. For example, the UBER® application may display a user selectable link 222 that uses a latitude and a longitude as parameters to determine a location. In some examples, the application card ID 432 is included in the resolver URL 438, such that resolver module 440 is able to find the card record 430.

In another example, if the card record 430 describes a function of the YELP® native application, the application card ID 432 may include the name "Yelp" along with a description of the application state described in the application state information 434. For example, the application card ID 432 for the card record 430 that describes the restaurant named "The French Laundry" may be "Yelp—The French Laundry." In an example where the application card ID 432 includes a string in the format of a URL, the application card ID 432 may include the following string "http://www.yelp.com/biz/the-french-laundry-yountville-2?ob=1" to uniquely identify the card record 430. In additional examples, the application card ID 432 may include a URL using a namespace other than "http://," such as "func://," which may indicate that the URL is being used as an application state ID in an application state. For example, the application card ID 432 may include the following string "func://www.yelp.com/biz/the-french-laundry-yountville-2?ob=1".

The application state information 434 includes data that describes an application state into which an application is set according to the access information 202 in the card record 430. Additionally or alternatively, the application state information 434 includes data that describes the function performed according to the access information 202 included in the card record 430. The application state information 434 may include text, numbers, and symbols that describe the application state. The types of data included in the application state information 434 may depend on the type of information associated with the application state and the functionality specified by the access information 202. The application state information 434 may include a variety of different types of data, such as structured, semi-structured, and/or unstructured data.

In some examples, the application state information 434 includes data that is presented to the user 10 by an application when the application is set in the application state specified by the access information 202. For example, if the access information 202 includes application access information, the application state information 434 includes data that describes a state of the native application after the user device 200 has performed the one or more operations indicated in the access information 202. In a specific example, if the card record 430 is associated with a shopping application, the application state information 434 includes data that describes products (e.g., names and prices) that are shown when the shopping application is set to the application state specified by the access information 202. As another example, if the card record 430 is associated with a music player application, the application state information 434 includes data that describes a song (e.g., name and artist) that is played when the music player application is set to the application state specified by the access information 202.

The types of data included in the application state information 434 may depend on the type of information associated with the application state specified by the access information 202. For example, if the card record 430 is for an application that provides reviews of restaurants, the application state information 434 includes information (e.g., text and numbers) related to a restaurant, such as a category of the restaurant, reviews of the restaurant, and a menu for the restaurant. In this example, the access information 202 causes the application (e.g., a native application or a web-browser application) to launch and retrieve information relating to the restaurant. As another example, if the card record 430 is for an application that plays music, the application state information 434 may include information relating to a song, such as the name of the song, the artist, the lyrics, and listener reviews. In this example, the access information 202 causes the application to launch and play the song described in the application state information 434.

The application card ID 432 may be used to identify a native application associated with the card record 430. The application card ID 43 may be a string of alphabetic, numeric, and/or symbolic characters (e.g., punctuation marks) that uniquely identifies the associated native application. In some examples, the application card ID 43 is the native application in human readable form. For example, the application card ID 43 may include the name of the application referenced in the access information 202. In some examples, the application card ID 43 for a restaurant finder application includes the name of the restaurant finder application.

As another example, the card record 430 may be associated with the OPENTABLE® application, developed by OpenTable®, Inc. The OPENTABLE® application is a restaurant-reservation application that allows users to search for restaurants and make restaurant reservations. The OPENTABLE® application provides information about restaurants including descriptions of restaurants and user reviews of the restaurants. The example card record 430 may describe an application state of the OPENTABLE® application in which the OPENTABLE® application accesses information for THE FRENCH LAUNDRY® restaurant.

In other examples, the application card ID 432 includes a URL as a unique identifier for the card record 430. For example, the application card ID 432 may include the string "func://www.yelp.com/biz/the-french-laundry-yountville-2?ob=1" as a unique identifier for the card record 430, or may include "func://" as a namespace, as described above.

The example application state information 434 includes data fields 435, such as a Title 435a of THE FRENCH LAUNDRY® restaurant, a description 435b of THE FRENCH LAUNDRY® restaurant, image 435c of THE FRENCH LAUNDRY® restaurant, and additional data fields 435. The title 435a field may include, for example, the text "French cuisine" and "contemporary" and the title of the restaurant. The description field 435b may include text that describes THE FRENCH LAUNDRY® restaurant. The image 435c may include text and/or an image of user reviews for THE FRENCH LAUNDRY® restaurant. The additional data fields 435 may include additional data for THE FRENCH LAUNDRY® restaurant that may not specifically fit within the other defined fields, such as a menu for the restaurant, prices, and operating hours for the restaurant. In some implementations, instructions for accessing the API 446 via information from a remote API server 330 in order to obtain additional application state information 434 are stored in the additional data fields 435 or the access information 202 of the card record 430. There are many formats that may be used to store and/or access the API 446, which may be indicated in the additional data fields 435 or access information 202. Any format acceptable to access the API 446 may be used. For example, the API 446 may be stored as a URL or FUNC:// type link in order to access the web server 332. For example, instructions for accessing the API server 330 may be stored as a URL.

The card record 430 includes one or more access information 202. The access information 202 may include a reference to the OPENTABLE® application. As an example, the access information 202 for the card record 430 may include a reference to the OPENTABLE® native application along with one or more operations to be performed by the user device 200. For example, the access information 202 may include an application resource identifier and/or one or more operations that cause the user device 200 to access the entry for THE FRENCH LAUNDRY® restaurant in the OPENTABLE® native application. An example application resource identifier may be "vnd.opentable.deeplink://opentable.com/restaurant/profile?rid=1180&refid=1."

In some implementations, the access information 202 includes edition information that indicates the application edition with which the access information 202 is compatible. For example, the edition information indicates the operating system with which the access information 202 is compatible. Moreover, different access information 202 may be associated with different editions of a native application. A native application edition (hereinafter "application edition") refers to a particular implementation or variation of a native application. For example, an application edition may refer to a version of a native application, such as a version 1.0 of a native application or a version 2.0 of a native application. In another example, an application edition may refer to an implementation of a native application for a specific platform, such as a specific operating system.

The different access information included in a card record may cause the corresponding application editions to launch and perform similar functions. Accordingly, the different access information included in a card record may cause the corresponding application editions to be set into similar application states. For example, if the different access information reference different editions of an information retrieval application, the different access information may cause the corresponding application editions to retrieve similar information. In another example, if the different access information reference different editions of an internet music player application, the different access information may cause the corresponding application editions to play the same song.

In some examples, a card record for a native application that retrieves restaurant information includes multiple different application access information for multiple different application editions. As an example, if the card record is associated with a specific Mexican restaurant, the application access information for the different application editions may cause each application edition to retrieve information for the same specific Mexican restaurant. For example, first application access information may cause a first application edition (e.g., on a first operating system) to retrieve information for the specific Mexican restaurant. Second application access information may cause a second application edition (e.g., on a second operating system) to retrieve information for the specific Mexican restaurant.

Figure 5:
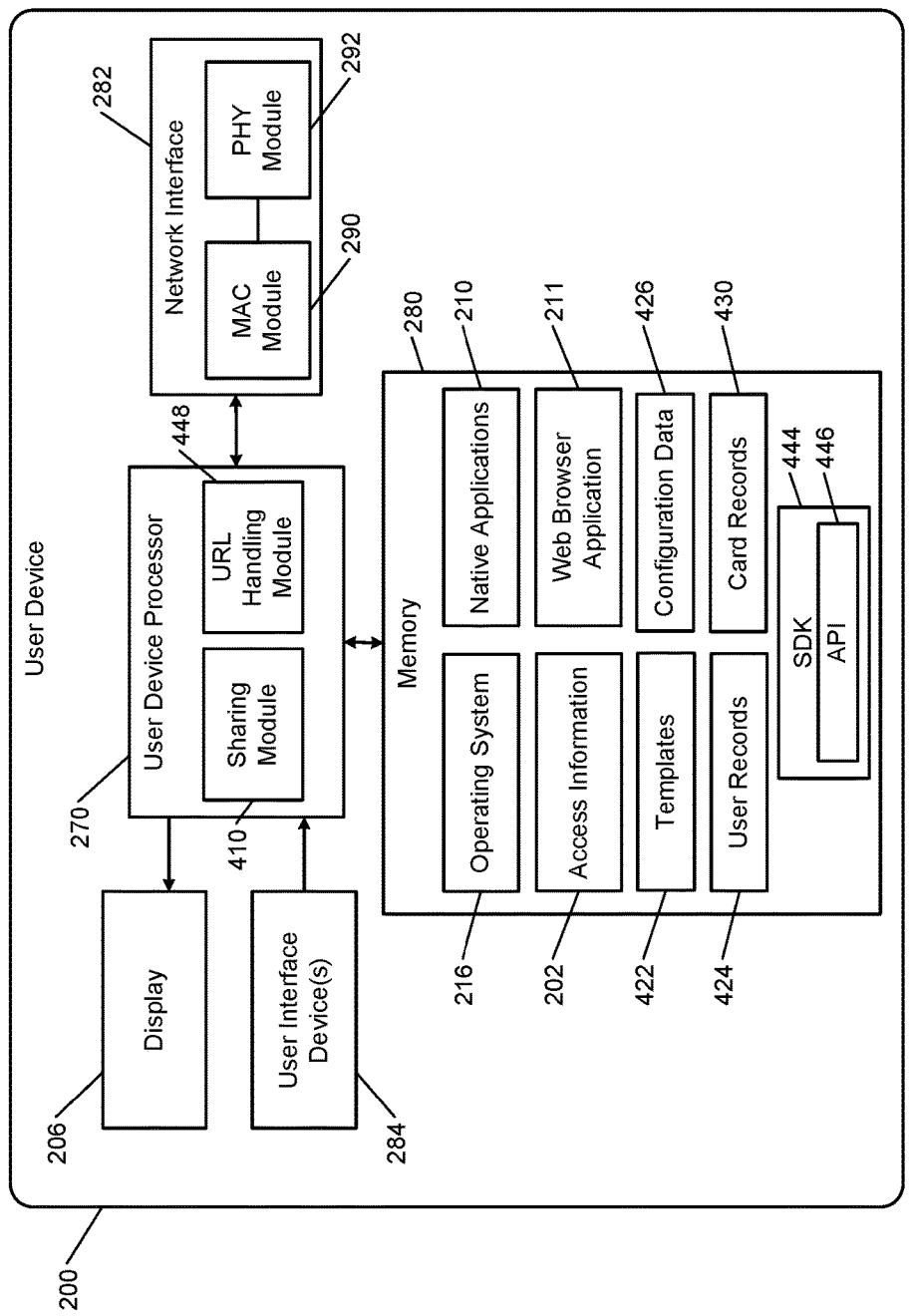
FIG. 5 is a functional block diagram of an example of a user device in accordance with an embodiment of the present disclosure.

FIG. 5 shows an example of the user device 200 including a user device processor 270 in communication with memory 280, a network interface 282, user interface devices 284 and/or display 206. The network interface 282 may include a media access control (MAC) module 290 and a physical layer (PHY) module 292, which communicates with other user devices, servers, networks, network devices etc. disclosed herein. The user device 200 may include other components as well. The user device processor 270 is configured to execute instructions stored in the memory 280 that when executed cause the user device processor 270 to perform operations. In some examples, the user device processor 270 executes one or more of a native application 210, a web browser application 211, and an operating system 216, all of which may be embodied as computer readable instructions. The operating system 216 may act as an interface between the user device processor 270 and the applications.

In some implementations, the user device processor 270 executes an application. The application is a set of computer readable instructions embedded in a native application. In the example shown, the user device processor 270 executes the sharing module 410, which may be stored in the memory 280. In other examples, the memory 280 is located remotely from the user device 200 and/or the sharing module 410.

The memory 280 may store programs (e.g., sequences of instructions) or data (e.g., program state information) on a temporary or permanent basis and perform as non-transitory memory for use by a computing device. For example, the memory 280 may store the computer readable instructions that make up the native applications 210, the web browser Apps 212, the operating system 216, and/or the sharing module 410. The non-transitory memory may be volatile and/or non-volatile addressable semiconductor memory. Examples of non-volatile memory include flash memory, read-only memory (ROM), programmable read-only memory (PROM), erasable programmable read-only memory (EPROM), electronically erasable programmable read-only memory (EEPROM) (e.g., typically used for firmware, such as boot programs). Examples of volatile memory include random access memory (RAM), dynamic random access memory (DRAM), static random access memory (SRAM), and phase change memory (PCM). The network interface 282 includes one or more devices configured to communicate with the distributed network 120.

The network interface 282 may include one or more transceivers for performing wired or wireless communication. Examples of the network interface 282 include a transceiver configured to perform communications using the IEEE 802.11 wireless standard, an Ethernet port, a wireless transmitter, and a universal serial bus (USB) port. The user interface devices 284 include one or more devices that receive input from and/or provide output to a user 10. The user interface devices 284 may include a touchscreen, a display, a QWERTY keyboard or other keyboard, a numeric keypad, a touchpad, a microphone, and/or speakers.

FIG. 6 shows an example of the sharing server 400. The sharing server 400 includes a server processor 402, memory 420 and a network interface 502. The server processor 402 may include the sharing module 410 and/or a resolver module 440. The memory 420 stores the templates 422, user records 424, configuration data 426, and card records 430. The network interface 502 includes a PHY module 506 and a MAC module 508. The PHY module 506 communicates with the networks, network devices, user devices, and/or servers disclosed herein.

Figure 7:
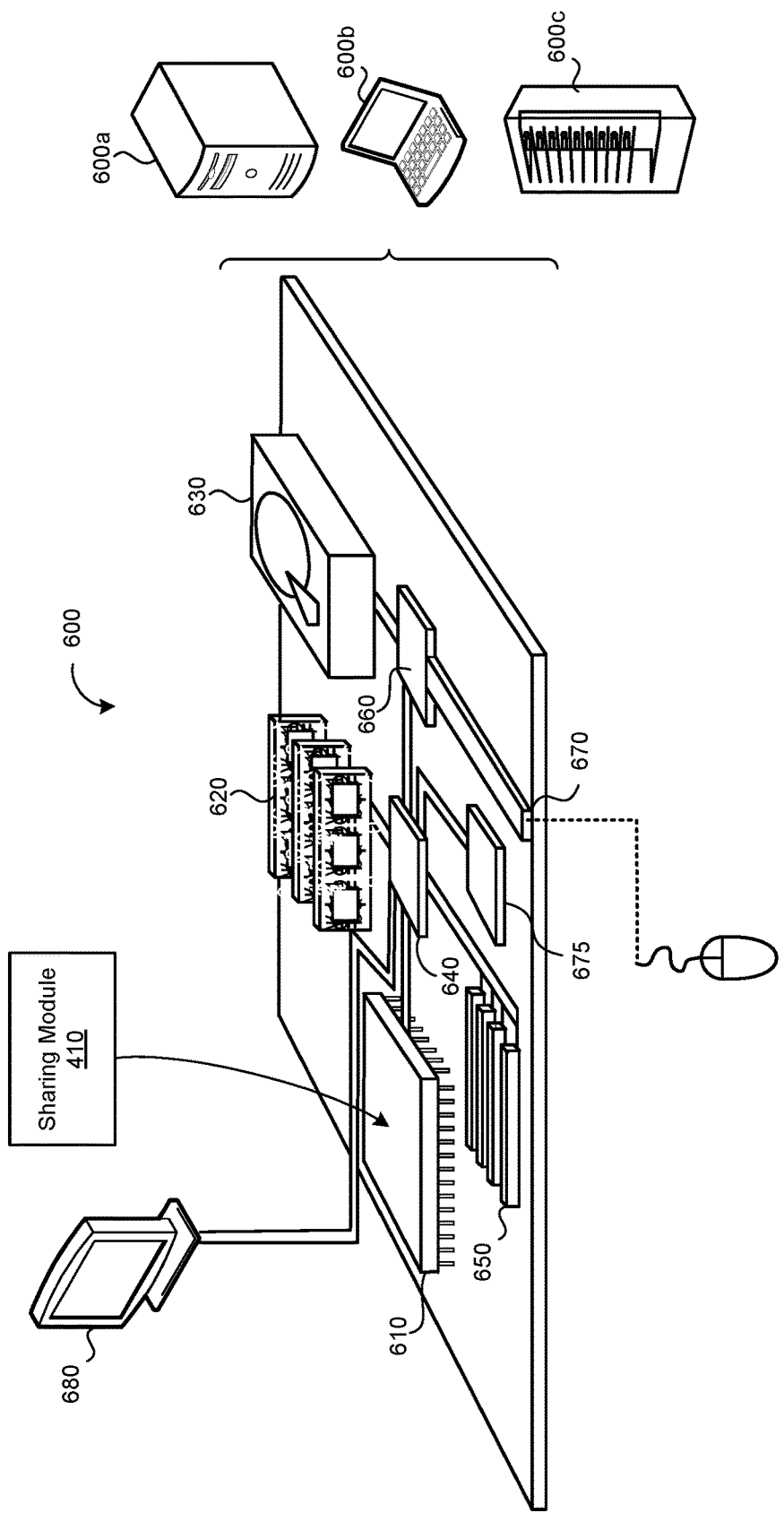
FIG. 7 is a perspective view of an example computing device configured to execute methods disclosed herein.

FIG. 7 shows an example computing device 600 that may be used to implement the systems and methods described in this document. The computing device 600 may be structurally representative of one or more of the user devices and/or servers disclosed herein. The computing device 600 may be a digital computer, such as a laptop, a desktop, a workstation, a personal digital assistant, a server, a blade server, a mainframe, or other appropriate computer. The components shown, connections, relationships between components, and corresponding functions are meant to be exemplary only, and are not meant to limit implementations of the disclosures described and/or claimed in this document.

The computing device 600 includes a processor 610, a memory 620, a storage device 630, a high-speed interface/controller 640, high-speed expansion ports 650, a low speed interface/controller 660, and an interface 675. The low speed interface/controller 660 is connected to low speed bus 670 and storage device 630. Each of the components 610, 620, 630, 640, 650, 660, 675 are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device (e.g., the display 680 coupled to high speed interface 640). In other implementations, multiple processors and/or multiple buses may be used, as appropriate, along with multiple memories and types of memory. Also, multiple computing devices 600 may be connected, with each device providing portions of the implemented operations (e.g., connected as a server bank, a group of blade servers, or a multi-processor system).

The memory 620 stores information non-transitorily within the computing device 600. The memory 620 may include computer-readable medium, volatile memory or non-volatile memory. The non-transitory memory 620 may store programs (e.g., sequences of instructions) or data (e.g., program state information) on a temporary or permanent basis for use by the computing device 600.

The storage device 630 is capable of providing mass storage for the computing device 600. In some implementations, the storage device 630 is a computer-readable medium. In various different implementations, the storage device 630 includes a floppy disk device, a hard disk device, an optical disk device, a tape device, a flash memory and/or other similar solid state memory device. The storage device 630 may include an array of devices, such as devices in a storage area network and/or in other configurations. In additional implementations, a computer program product is tangibly embodied in an information carrier. The computer program product includes instructions that, when executed, perform one or more methods, such as those described above. The information carrier is a computer or machine-readable medium, such as the memory 620, the storage device 630, or memory on processor 610.

The high-speed controller 640 manages bandwidth-intensive operations for the computing device 600, while the low-speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which accepts various expansion cards (not shown). In some implementations, the low-speed controller 660 is coupled to the storage device 630 and low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 600 may be implemented in a number of different forms, as shown. For example, it may be implemented as a standard server 600*a* or multiple times in a group of such servers 600*a*, as a laptop computer 600*b*, or as part of a rack server system 600*c*.

Figure 10:
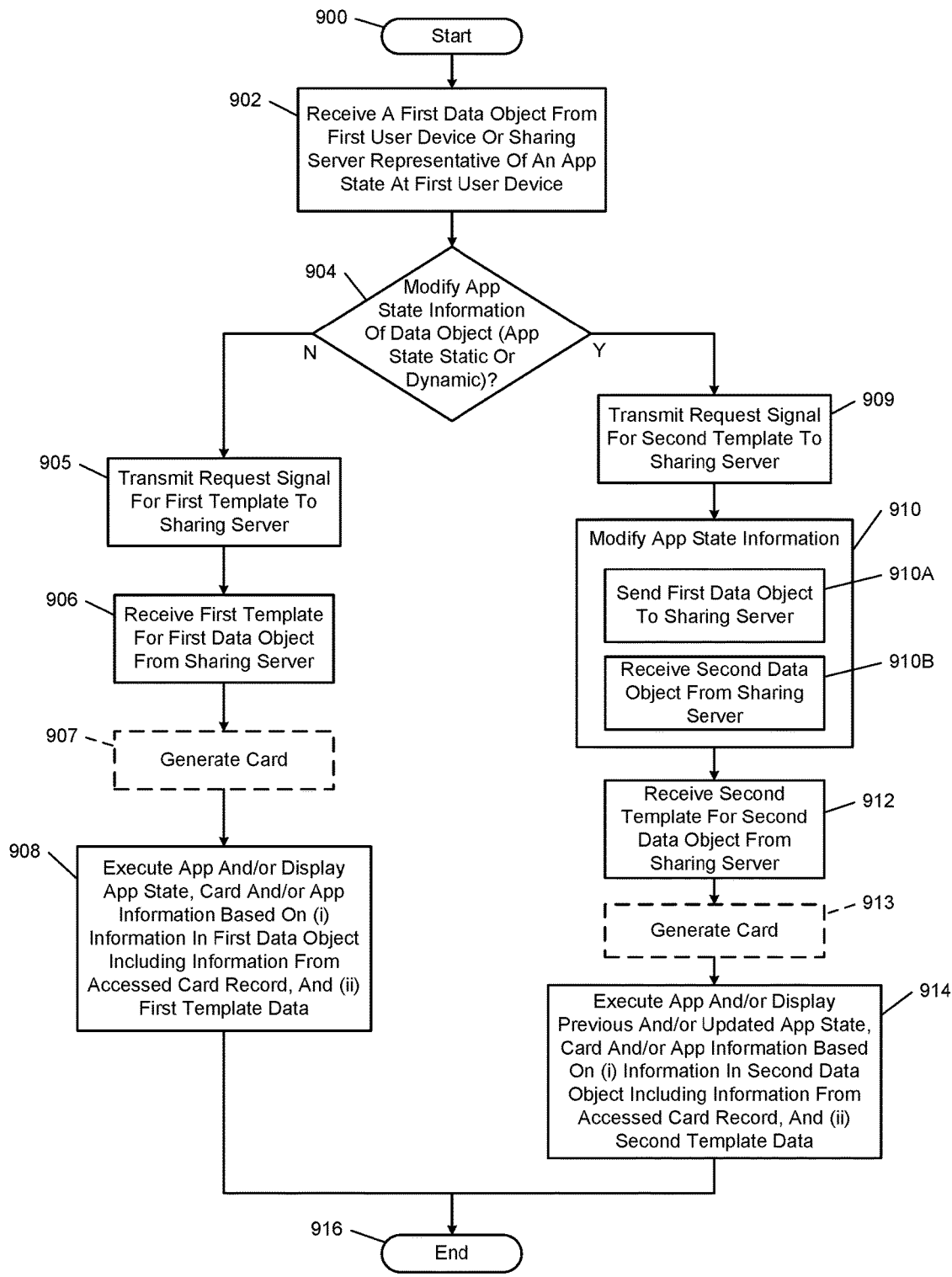
FIG. 10 illustrates an example method of modifying (or formatting) and rendering application state related data at the second user device corresponding to an application state shared during the method of FIG. 8 by the first user device.
Figure 12:
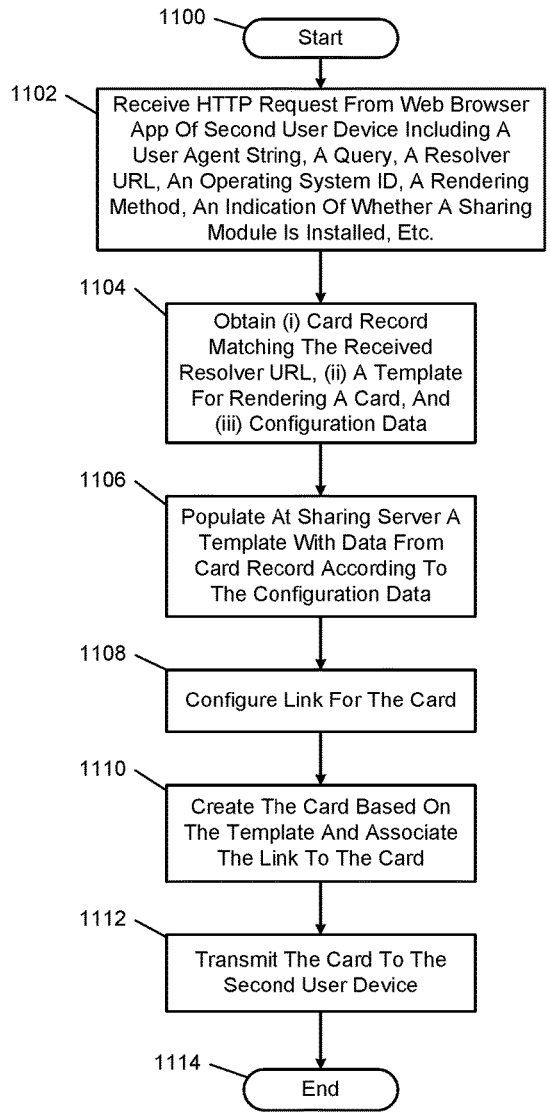
FIG. 12 illustrates an example method of creating a card via a sharing module in accordance with an embodiment of the present disclosure.
Figure 13:
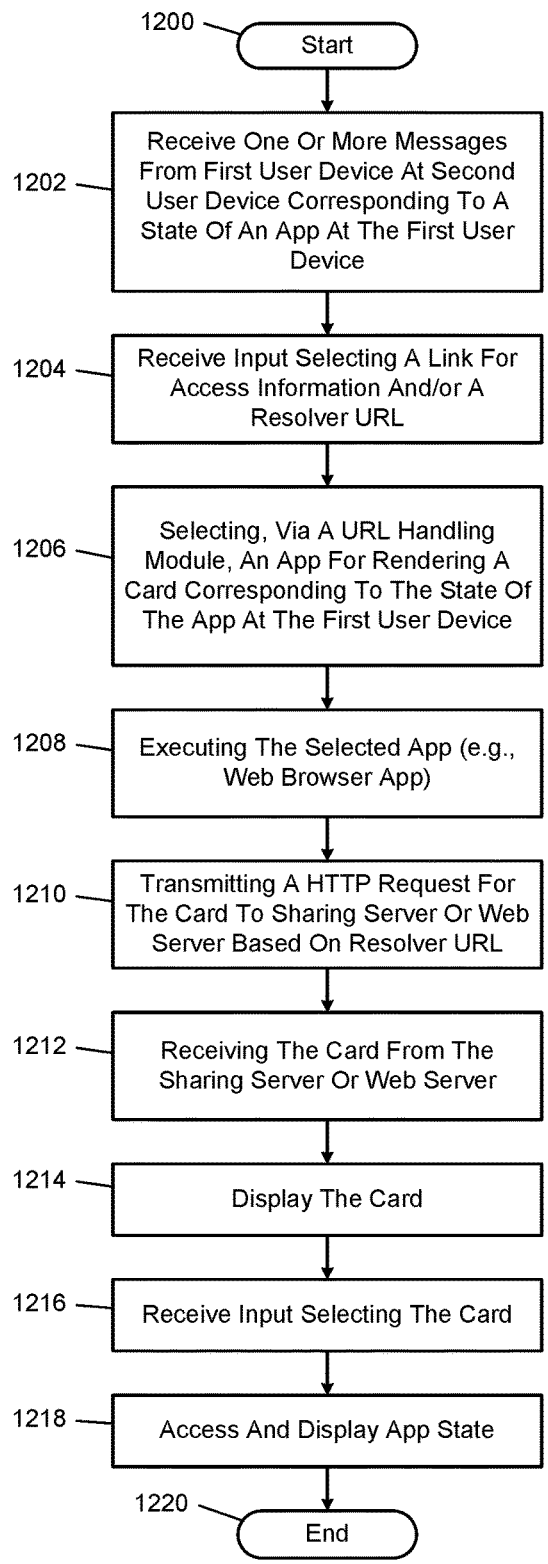
FIG. 13 illustrates a method of rendering a card at a second user device based on messages received from a first user device in accordance with an embodiment of the present disclosure.

For further defined structure of the modules, processors, and controllers of FIGS. 1-3G and 6-7 see below provided methods of FIGS. 8-13 and below provided definition for the term "module". The systems disclosed herein may be operated using numerous methods, example methods are illustrated in FIGS. 8-13. The methods of FIGS. 8-10 correspond to at least FIGS. 3A-3D. The methods of FIGS. 11-13 correspond to at least FIGS. 3E-3G. Although the following methods are shown as separate methods, one or more methods and/or operations from separate methods may be combined and performed as a single method. For example, the method of FIG. 8 may be performed while the methods of FIGS. 9-10 are performed. As another example, the method of FIG. 11 may be performed while the methods of FIGS. 12-13 are performed.

In FIG. 8, a method of sharing an application state between user devices is shown. Although the following operations are primarily described with respect to the implementations of FIGS. 8-10, the operations may apply to other implementations of the present disclosure. The operations may be iteratively performed and/or performed in a different order than described. The method may begin at 700. At 702, the user interface device 284 or display 206 of the user device 200*a* may receive a user input corresponding to touching of the share button 222 to share a state of an app currently executed and displayed on the first user device 200*a*. Each additional interaction between the user and the user device 200*a* with respect to the app may result in a new state of the app.

At 704, the sharing module 410 at the user device processor 270 may generate share and destination buttons and/or requests, which are displayed to a user of the first user device 200*a*. At 706, the user interface device 284 or display 206 of the first user device 200*a* may receive user inputs indicating the share and destination selections as described above with respect to FIG. 3A.

At 708, the sharing module 410 may determine app state and app state information. This may include the sharing module via the network interface 282 sending a card record and/or app information request to the sharing server 400 at 708A. At 708B, the sharing server 400 may respond and provide a card record and/or APP information back to the network interface 282.

At 710, the sharing module 410 may generate a first data object representative of the state of the app based on the information received from the sharing server 400. This may include the information in the card record including an ID of the second user device 200*b*. The first data object includes information to recreate the app state in the second user device 200*b*. The first data object includes a card record associated with the app state and access information having a reference to the application and indicating a performable operation for the application to enter an operating state providing information from the card record. The first data object may also include additional data relating to the user of the first user device 200*a*, the operating system 216, configuration files, screen formatting, display type, display size, and/or display configuration data.

At 712, the sharing module 410 may generate and display a card corresponding to the app state. The API 446 or SDK 444 includes the functions and instructions to convert the first data object into a card that can be displayed by the first user device 200*a*. The card includes the information from the card record. The card record may include additional information including the application card ID 432, application state information 434, access information 202, and template ID 436.

In some implementations, when the card includes a user-selectable link associated with the access information 202, the method includes receiving, at the user device processor 270, a user input for selection of the user selectable link and executes a sharing application based on the access information 202 associated with the selected user selectable link. The user 10 selection may include at least one of a voice command, a touch gesture, or a click selection.

When the card includes a user selectable link associated with the access information 202, the method may include receiving, at the user device processor 270, a user selection of the user selectable link and displaying a representation of the app state of the application executed on the second user device 200*b*. This may occur without executing the application on the second user device 200*b*. The method may further include populating the card and/or corresponding template with the information from the card record based on at least one of a type of the first user device 200*a*, an operating system of the first user device 200*a*, a type of the first data object, or a type of the user of the first user device 200*a*. The type of the first user device 200*a* may include the characteristics of the first user device 200*a*, such as whether the first user device 200*a* is a phone, tablet, media player, desktop, or laptop and whether the generation, manufacturer, and or version of the first user device 200*a*. The operating system type may be representative of the respective operating system 216 or the current application running on the first user device 200*a*. The user type may include characteristics of the user including a location, IP address, preferences, accounts, physical characteristics and or collected data regarding the user. The method may also include sending the first data object from the first user device 200*a* to a third user device associated with a third user. The first data object may include display configuration data. The display configuration data may include information on (i) how the API 446 or SDK 444 instructs the first user device 200*a* to display the first data object, or (ii) functions that are not implemented by the first user device 200*a* and second user device 200*b*.

At 714, the sharing module 410 may determine whether the card is to be modified. This may be based on a user input indicating that the card be modified. If the card is to be modified, task 715 may be performed; otherwise task 716 may be performed. At 715, the app state may be modified due to interaction with the user. At 716, the sharing module 410 may send the first data object via the network interface 282 to the second user device 200*b*. The first data object may be initiated and sent to the second user device 200*b* and/or the sharing server 400 using a user selectable link. The method may end at 718.

FIG. 9 shows a method of providing a card record and a template from a sharing server to user devices 200*a*, 200*b*. Although the following operations are primarily described with respect to the implementations of FIGS. 8-10, the operations may apply to other implementations of the present disclosure. The operations may be iteratively performed and/or performed in a different order than described. The method may begin at 800. At 802, the sharing server 400 via the network interface 502 receives the card record and/or app information request from the first user device 200*a* for the app state of the first user device 200*a*.

At 804, the sharing module 410 of the server processor 402 of the sharing server 400 searches for a card record and/or app information based on the information in the card record and/or app information request. At 806, the sharing module 410 of the sharing server 400 may determine compatibility of the second user device 200*b* for the app as described above. The sharing module 410 determines a compatibility type of the second user device 200*b* based on the identification of the second user device 200*b*. The sharing server 400 may access the memory 420 to determine the compatibility type of the second user device 200*b*. The memory 420 includes templates 422, user records 424, configuration data 426, and card records 430 for determining the compatibility type. In some implementations, determining the compatibility type of the second user device 200*b* includes searching a data source or memory 420 for compatibility information based on the identification of the second user device 200*b*. Operation 806 may account for when the platforms of the first user device 200*a* and the second user device 200*b* are the same or different and/or whether the first user device 200*a* and the second user device 200*b* have the same or different SDK. Operation 806 may also account for whether the user devices 200*a*, 200*b* are capable of executing the same application and/or versions of the same application.

At 808, the sharing module 410 may modify and/or transmit the card record based on the determined compatibility at 806 to the first user device 200*a*.

At 810, the network interface 502 may receive the first data object from the first user device 200*a* or from the second user device 200*b*. The sharing server 400 is configured to receive the first data object via the distributed network 120. The first data object may include the ID of the second user device 200*b*.

At 812, the sharing module 410 determines whether the first data object is to be formatted. If the first data object is to be formatted, task 814 is performed. For example, if the second user device 200*b* is unable to execute and display the app state based on the information provided in the first data object and/or is unable to execute the same version of the application corresponding to the app state, then the first data object is formatted. If the first data object is not formatted, then task 816 is performed.

At 814, the sharing module 410 of the sharing server 400 may format the first data object to create a second data object that is compatible with the second user device 200*b*. The sharing server 400 may use information in the memory 420 including templates 422, user records 424, configuration data 426, access information, and card records 430 to convert the first data object to the second data object and ensure compatibility with the second user device 200*b*. The sharing module 410 may reference the memory 420 to determine how to format the first data object to the second data object or find a suitable substitute function that performs the same function as the first data object and replace the first data object with the second data object.

The second data object includes a card record 430 associated with the app state and access information 202 having a reference to the application and indicating a performable operation for the application to enter an operating state providing information from the card record 430. The second data object allows the second user device 200b to open the application referenced in the first data object to the same state as the app state that generated that first data object.

The access information is formatted based on the compatibility type of the second user device 200b. The sharing server 400 is able to convert the access information to an appropriate format that is compatible with the second user device 200b by reference to the memory 420. The first data object may be formatted to be displayed as a card. In some examples, the method includes populating a template with the information from the card record 430 and based on at least one of the type of the first user device 200a, the operating system of the first user device 200a, the data object type, or the user type.

At 816, the sharing module 410 may select a template using a threshold fit process. The sharing module 410 may threshold fit the first data object and/or the second data object to stored templates and/or based on template ID in card record information. The template that best matches or corresponds with the first data object or the second data object is selected. The second data object includes the card record and the access information, where the access information has a reference to the application executed on the first user device 200a and indicates an operation for a version of the application to enter the state, and where the access information is formatted based on the compatibility type of the second user device 200b. At 818, the second data object and/or the template are transmitted to the second user device 200b. The method may end at 820.

FIG. 10 shows a method of modifying and/or formatting and rendering the app state of the first user device 200a at the second user device 200b. Although the following operations are primarily described with respect to the implementations of FIGS. 8-10, the operations may apply to other implementations of the present disclosure. The operations may be iteratively performed and/or performed in a different order than described. The method may begin at 900. At 902, the network interface 282 of the second user device 200b receives a first data object from the first user device 200a or the sharing server 400. The first data object is representative of the app state at the first user device 200a.

At 904, the sharing module 410 of the second user device 200b determines whether to modify app state information of the first data object. This may include determining whether the app state information is static or dynamic. If the sharing module 410 of the second user device 200b determines that the first data object is incompatible or unable to be properly displayed, the second user device 200b may send the first data object to the sharing server 400 for translation of the first data object into a compatible data object. If the app state information is static and/or is not to be modified task 906 is performed, otherwise task 910 is performed.

At 905, the sharing module 410 of the second user device 200b may send a request signal to the sharing server 400 for the first template. At 906, the sharing module 410 of the second user device 200b receives the first template provided at 818 for the first data object from the sharing server 400. At 907, the sharing module 410 of the second user device 200b may generate the card for the app state.

At 908, the sharing module 410 executes the app and/or displays on the display 206 of the second user device 200b the app state, the card corresponding to the app state, app information corresponding to the app state. This is based on (i) information in the first data object including information from the accessed card record, and (ii) data in the first template.

At 909, the sharing module 410 of the second user device 200b may send a request signal to the sharing server 400 for the second template. At 910, the sharing module 410 modifies and/or has the app state information of the first data object modified. This may include the sharing module 410 sending the first data object to the sharing server 400 at 910A. At 910B, the sharing module 410 may receive the second data object generated at 814 and transmitted from the sharing server 400 at 818.

At 912, the sharing module 410 may receive a second template for the second data object transmitted at 818. At 913, the sharing module 410 of the second user device 200b may generate the card for the updated app state or a second version of the app state.

At 914, the sharing module 410 (i) executes an app compatible with the second user device 200b and corresponding to the app executed on the first user device 200a, and/or (ii) displays on the display 206 of the second user device 200b a compatible app state corresponding to the app state of the first user device 200a, the card corresponding to the compatible app state, app information corresponding to the compatible app state. This is based on (i) information in the second data object including information from the corresponding accessed card record, and (ii) data in the second template. The method may end at 916.

For operations 908 and 914, the API 446 and SDK 444 include the functions and information to display the card on the display 206. The card may be displayed in a dedicated application or inside an already running application. The card may include the information from the card record 430. When the card includes a user selectable link associated with the access information 202, the method may include receiving a user selection of the user selectable link and displaying a representation of the app state executable on the second user device 200b without executing the application. The method may further include populating template 422 with the information from the card record 430 based on at least one of the type of the first user device 200a, the operating system of the first user device 200a, the data object type, and/or the user type. The method may also include sending the first data object or the second data object from the second user device 200b to a third user device. The second data object may include display configuration data including information on how the API 446 or SDK 444 instructs the second user device 200b to display the first data object or the second data object or functions not performed by the first user device 200a and second user device 200b.

Figure 11:
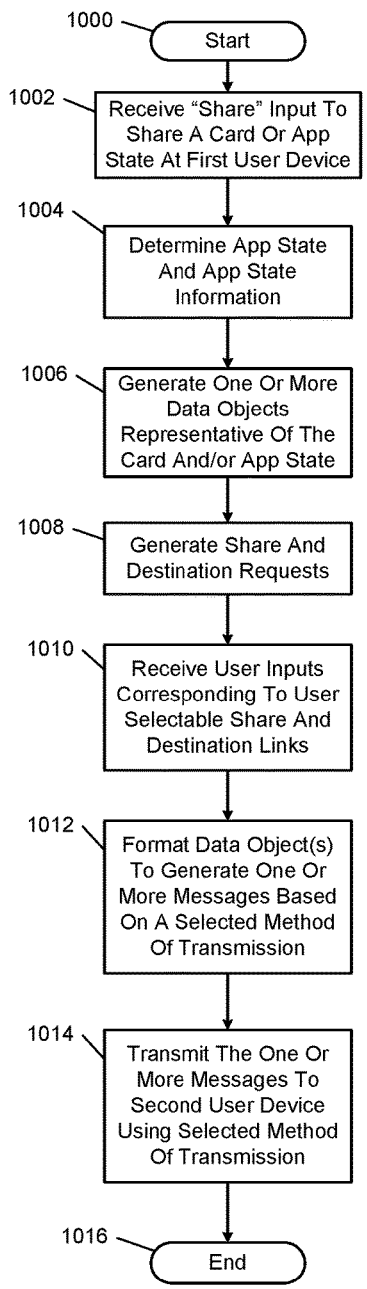
FIG. 11 illustrates an example method of sharing a card and/or an application state of a first user device with a second user device in accordance with an embodiment of the present disclosure.

FIG. 11 shows a method of sharing a card and/or an app state between user devices 200a, 200b. Although the following operations are primarily described with respect to the implementations of FIGS. 11-13, the operations may apply to other implementations of the present disclosure. The operations may be iteratively performed and/or performed in a different order than described. The method may begin at 1000. At 1002, the user interface device 284 or display 206 of the user device 200a may receive a user input corresponding to touching of the share button 222 to share a state of an app currently executed and displayed on the first user device 200a or a card corresponding to the state of the app. A user selectable link associated with the selected card is used to identify the app state to be shared. The app state includes information such as images and text corresponding to information stored in a card record. The card may include information such as images and text corresponding to information displayed in the app state. The card may be selectable by the user in order to launch the application and set the application in the state represented by the card based on access information 202.

At 1004, the sharing module 410 of the first user device 200a may determine the state of the app and/or app state information. At 1006, the sharing module 410 of the first user device 200a (or the sharing module of the sharing server 400) may generate one or more data objects representative of the card and/or the app state based on the information determined at 1004. If the data objects are generated at the sharing server 400, the state of the app and/or the app state information may be transmitted to the sharing server 400 and the sharing server 400 may return the data objects.

The sharing module 410 of the first user device 200a selects information from the card to create data object(s) for transfer to the receiving user device 200b. Information elements may be selected based upon information selection rules and a selected method of transmission. For example, the card may be rendered using a particular template, which may include image 435c with a tag "main image," and description 435b with a tag "description." In this example, an information selection rule may indicate that a first data object may include an image tagged as "main image," and second data object may include text tagged as "description." Moreover, the selected method of transmission may be compatible with image messages. Accordingly, the sharing module 410 creates data object(s) containing image 435c and description 435b for transmission to receiving user device 200b. Furthermore, the sharing module 410 may select a resolver URL 438 associated with the card for transmission as a third data object. In some embodiments, the sharing module 410 of device 200a may retrieve additional information from sharing server 400 in order to create data objects for transmission.

The sharing module 410 integrated with a native application displaying the app state may extract information from the app state in order to create data object(s). In one embodiment, the sharing module 410 captures a screenshot of all or part of the displayed app state. The sharing module 410 may also communicate with sharing server 400 to retrieve additional information in order to create data object(s). In particular, sharing module 410 may send a query containing information about the app state to the sharing server 400.

At 1008, the sharing module 410 of the first user device 200a may generate share and destination requests, which are displayed to a user of the first user device 200a. As part of the selection process, the first user device 200a may display menus for the user to select a particular messaging application for sharing the card and/or app state and a second user to receive the shared card and/or app state.

At 1010, the user interface device 284 or display 206 of the first user device 200a may receive user inputs indicating the share and destination selections as described above with respect to FIG. 3A. The share selection indicates the method of transmission selected by the user of the first user device 200a.

At 1012, the sharing module 410 of the first user device 200a or of the sharing server 400 formats the data object(s) to generate one or more messages based on the method of transmission selected by the user of the first user device 200a. If the sharing module 410 of the sharing server 400 performs this operation, then the data objects may be transmitted to the sharing server 400 and the sharing server 400 transmits back the one or more messages to the first user device 200a. A user may have selected the method of transmission at 1010 or a default method of transmission may be selected. The one or messages may include a resolver URL (e.g., the resolver URL 438). As an example, when a user selects a text messaging transmission method (e.g., an SMS service), the data objects may be formatted into short messages. Formatting may include splitting long text strings into separate messages, concatenating short text strings into a single message, formatting images into multimedia messaging service (MMS) messages, and the like. As another example, when a user selects an email messaging service, processing may include automatic creation of a subject line, rendering of information using markup language, and the like. The sharing module 410 of the first user device 200a may execute formatting according to information selection rules.

At 1014, the network interface 282 transmits the one or more messages to the second user device using the selected method of transmission. The formatted data objects are sent as messages (e.g., messages 224) to the specified received user device 220b. The sharing module 410 may send a message to the selected messaging application (e.g., one of applications 210) indicating the receiving user device 200b and the content of data objects to be sent as messages 224. The method may end at 1016.

FIG. 12 shows a method of creating a card via a sharing module. Although the following operations are primarily described with respect to the implementations of FIGS. 11-13, the operations may apply to other implementations of the present disclosure. The operations may be iteratively performed and/or performed in a different order than described. The method may begin at 1100. At 1102, the network interface 502 of the sharing server 400 receives a HTTP request from the second user device 200b including a user agent string, a query, a resolver URL, an operating system ID, a rendering method, an indication of whether the sharing module 410 is installed at the second user device 200b, etc. The HTTP request may be from the web browser application 211 running on the second user device 200b. The selected application accesses the sharing server 400 using the resolver URL. When the selected application is a web browser application, it may access a web server run by the resolver module 440 using the resolver URL.

At 1104, the resolver module 440 searches for a card record matching the received resolver URL, a template for rendering the card, and configuration data. The resolver module 440 at the sharing server 400 may search for the card record matching the app state and send information elements back to sharing module 410. The resolver module 440 and/or sharing module 410 may select information elements based upon information selection rules and a selected method of transmission. For example, card record 430 may include description information 435b and image information 435c. In this example, an information selection rule may indicate that a first data object should include an image and a second data object should include description text. Moreover, the selected method of transmission may be compatible with image messages. Accordingly, the sharing module 410 creates data object(s) 320 containing image 435c and description 435b for transmission to receiving device 200b. Furthermore, the sharing module 410 may select a resolver URL 438 for transmission, for example, as a third data object.

The resolver module 440 finds a card record matching the received resolver URL, a template for rendering a card that matches the template identifier of the card record, and configuration data for a template with the given template identifier. When the resolver module 440 responds to a web browser application, the resolver module 440 may select a web template. When the resolver module 440 responds to a native application, the resolver module 440 may select a template for the specified operating system, unless the rendering method is a web rendering method.

At 1106, the sharing module 410 or the resolver module 440 at the sharing server 400 may populate a template with data from the card record according to the configuration data. At 1108, the resolver module 440 at the sharing server 400 configures a link (e.g., HTTP link) for the card. The resolver module 440 may select access information to configure a link for the card. The access information may be selected based on the application that will display the card, the operating system, and/or whether the application is installed. In some embodiments, the resolver module 440 selects web access information to configure a link for a web card. In these or other embodiments, the resolver module 440 may select application access information if the operating system is known and the corresponding application is installed. In alternate embodiments, the resolver module 440 selects application access information based on the operating system specified by the user agent string.

At 1110, the sharing module 410 at the sharing server 400 creates the card based on the template and the configured link to the card. At 1112, the network interface 502 transmits the card to the second user device. After populating template to create the card, the resolver module 440 sends the card back to the receiving user device 200*b*, where the card is rendered for display in the selected application. The method may end at 1114.

FIG. 13 shows a method of rendering a card at the second user device 200*b* based on message received from the first user device. Although the following operations are primarily described with respect to the implementations of FIGS. 11-13, the operations may apply to other implementations of the present disclosure. The operations may be iteratively performed and/or performed in a different order than described. The method may begin at 1200. At 1202, the network interface 282 at the second user device 200*b* receives the one or more messages transmitted at 1014. The message(s) correspond to a state of the app at the first user device 200*a*. A user of receiving device may open messaging application 210 and view the messages. Messages may include images and/or text representing the app state shared by the sending user device 200*a*. One of the messages may include the resolver URL 438, which may be formatted as a selectable link.

At 1204, the user interface devices 284 or display 206 receives an input from a user selecting a link for access information and/or the resolver URL. The user of the receiving device 200*b* may select the link including resolver URL 438.

At 1206, the URL handling module 448 selects an app for rendering a card corresponding to the app state of the first user device 200*a*. The URL handling module 448 determines which application should intercept and receive the resolver URL. If a sharing module 410 is not installed at receiving user device 200*b* (e.g., if no applications 210 installed at receiving user device 200*b* include an integrated sharing application and/or the receiving user device 200*b* does not include the sharing module 410 module 410), a web browser application may be specified by the URL handler module 448. If a sharing module 410 is installed at the receiving user device 200*b*, an application including a sharing application that operates similar to the sharing module 410 may be selected to receive the resolver URL.

At 1208, the user device processor 270 of the second user device 200*b* executes the app selected at 1206. As an example, the selected app may be a web browser app. If the access information is web access information, the browser application 211 may handle the access information by accessing a web page specified by the web access information that corresponds to the app state. If the access information is application access information, a native application 210 may handle the access information by accessing the app state.

At 1210, the user device processor 270 of the second user device 200*b* transmits the HTTP request for the card to the sharing server 400 or web server 312 based on the resolver URL. The selected application accesses the sharing server 400 using the resolver URL. When the selected application is a web browser application, the selected application may access a web server run by the resolver module 440 using the resolver URL.

At 1212, the sharing module 410 of the second user device 200*b* receives the card, including the link configured at 1108, from sharing server 400 or the web server 312. At 1214, the sharing module 410 of the second user device 200*b* displays the card on the display 206 of the second user device 200*b*.

At 1216, the user interface devices 284 or the display 206 receives a user input selecting the card/link. This may cause the processor of the second user device 200*b* to request that the sharing server convert the link to another (or deep) link and launch a search engine results page (SERP) within the app. At 1218, the sharing module 410 displays the app state corresponding to the app state shared by the first user device 200*a*. The method may end at 1220.

The above-described operations of FIGS. 8-13 are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events.

As another example, a card is shared from a device A (origin device) to a device B (destination device). The underlining assumption in this example is that the app on device A used to share cards is integrated with a SDK, and the SDK has the ability of working with links and supplying cards. The platforms of devices A and B may be an Android® platform, an iOS® platform or a tablet platform.

In other examples, a generic app in device A is integrated with SDK is shared with device B. A user A of device A and while running the generic app clicks a "Share" button, such that a list of options on how to share is displayed. The list of options asks user A "Do you want to share this card via, for instance, Messenger, Hangout, email, Bluetooth®, . . . ?" Assuming user A decides to choose Hangout to share the card with user B of device B, then user A chooses to whom he/she wants to share the card. A list of user A's Hangout friends/contact list is displayed and user B is included in this list. Once user A chooses user B and clicks "Send" button, the actions of "share a card" on device A are completed.

Now on device B, several situations can occur: 1) device B has the same platform as device A and device B is also installed with Hangout, and the generic app in device B is SDK integrated; 2) device B has a different platform than device A, although device B also has Hangout installed and the generic app is SDK integrated; 3) device B has a same or different platform as device A and none of Apps in device B is SDK integrated; 4) device B has a same or different platform as device A and some other App(s) other than the generic app in device B are SDK integrated; 5) besides above 4 situations, device A and B can both have a Launch app installed and devices A and B directly share cards via the Launch app.

In other examples, the devices A and B have a same platform, a same app and are integrated with SDK. In this situation, a lot of capabilities exist that may be shared between the two users. In the generic app on device A, there is the sharing function, where SDK may package and deploy a data object. When that data reaches device B, the data object supplies the data to SDK, which is inside the generic app on device B. The SDK on device B receives, interprets and displays the data.

In other examples, devices A and B have different platforms, a same app, and are both integrated with SDK. As along as the SDKs are built for Android®, iOS® or other platforms and can understand the data exchange, the same method can be used across platforms. If the SDKs render the JSON binary large object (blob) on both platforms, then the devices A and B may send the JSON blob data across platforms. The job of the SDKs is to translate the custom formatting to a local object that devices can render in a view.

In other examples, device B has no app integrated with SDK. In this case, to send or share cards as a text message, a simplest version that may be sent is to pass the URL of the particular card. On device B, some of the messenger Apps have capabilities to display images. If the data object is sent to these messenger Apps, the messenger Apps take care of image rendering automatically, like a JPEG. For some other messenger Apps, if a link is received that is an image, rendering occurs automatically.

The cards may be shared in an image format or a text format. The cards may also be shared via emails by being linked to the email app after clicking the share button. The email app may prepare a subject line, and user A can enter the image, as well as the http link. For instance, if the http link is http://quixey.com/ . . . , then if user B clicks on that link once received, device B access the servers that convert that http link and launches SERPs within the corresponding app.

In other examples, the online resolver is used and then the card is displayed in a browser, not inside the messaging app, but in the web browser itself. A web SDK may not be used because of standard html files. The online resolver figures out the configurations and then displays cards in the browser window.

In other examples, the generic app in device B is not SDK integrated, however other Apps (e.g., Yelp) are SDK integrated. In this case, device B receives a link in Hangout, http://quixey.io/ . . . and user B clicks on this link. SDK in device B, although integrated with Yelp, detects the click and then handles the interaction locally and launches the app state. Basically, SDK registers for listening on http://quixey.io/ . . . . For any request that comes to that URL, SDK provides the prompt "What do you want to do with it?" User B may have a choice to view the card via the web service or via a locally listening service. Both devices A and B have SDK integrated Apps installed. Instead of sharing an http link, a quxiey:// . . . protocol link is also available. This type of link can be directly intercepted by SDK, such that the users do not get questions like "choose from these two options". SDK can directly link to the app state. For each app, the link is written as Quixey:// . . . followed by the software product ID. Each app has a unique software product ID, such that the app detects only the Apps broadcast, e.g. FB can only listen to the shared FB cards, and generic app may only detect (or listen) the shared generic app cards. As a result, there is no competing listener.

In other examples, both devices A and B have a Launch app installed. Inside any app, if a user clicks the "share" button, the user will need to choose from a list of options on how to share, such as via Bluetooth®, message Apps, etc. The Launch app may be one of the options to share the state of the app. Similar to sharing via Hangout, for example, choosing to share via the Launch app, the user is asked "Whom do you want to send it to?" A list of suggested destinations may also be provided, i.e. the contacts/friends with user device that also have the Launch app installed. Once the user chooses the destination, the Launch app shares the card to the destination.

In other example, the Launch app has the SDK installed. The Launch app intercepts the message and can display the cards. The Launch app may be associated with a search provider account (e.g., a Google® account); such that the Launch app account identity is linked to the search provider account (i.e. the search provider account is reused as the identifier for the Launch App).

The Launch app installed on device B may show a card, maybe showing a notification bar/pop-up on a home screen. Then user B can click on the card, such that the app may enter the state and be a seamless experience: SDK may directly transition to the app state without showing a card notification. For example, a generic app card may be shared via a Launch app. On device B, SDK launches the state within generic app directly.

For a seamless experience method, a user via a user device may directly invoke the app state. If a user logs in a browser in both a desktop and phone, the card may be shared between the two devices. For example, on desktop, the user shares a Google® map with his/her phone: "send this direction to my phone". Then on the phone, the user starts seeing the direction. The user does not need to be first shown a card, click the card and then see the direction. A another example, if a user sends a link: Quixey.io/furl=uberpickuptime, instead of displaying the card of Uber and the pick-up times, SDK may directly invoke Uber® and show user B the pick-up times directly. It is one step further than displaying the card.

In other examples and for the pop-up method, there may be a cards feed, such that users may not only share cards to a particular user, but can also share to a group. Whoever subscribes to the group, users can see the updates shown up in the feed.

In other examples, the data object may include a data blob of JSON, which SDK receives from an API server directly. The data object is one piece of JSON and only SDK is able to interpret the data object. The data object does not include layout information directly. The data object includes data including configuration data and/or a function URL. The data is to be shown in the appropriate places in the user interface (UI). The configuration provides information about how the UI elements need to be structured including the capability to configure the template. The function URL uniquely identifies the card. An example of a function URL is furl://yelp.com/ . . . .

Each JSON blob has data. The data, for example for the generic app, includes ranking data, description data, image data, image URL data, etc. In case of different platforms, the JSON blob from an Android® platform sends data to an iOS® platform. The SDK in the iOS® platform knows the UI elements in the cards and information for mapping the data, such that: the image data is mapped to the appropriate image icon; a corresponding title is mapped to a displayed top section, and so on. This information of the layout of the UI elements may be stored as a standardized template and is available to the SDK. The information may be downloaded as required from one or more of the servers disclosed herein.

In other examples, the standardized template (or other template disclosed herein) is stored on one of the servers and/or in memory (e.g., cache) of a target device. If the template is not stored on the target device, the device, via the SDK, makes a call to the appropriate server. The template is then downloaded from the server to the target device. Different templates may be used for different situations/conditions. The templates may be generated based on specifications for items, such as place, product, creative work, etc. Each of these specifications has different kinds of elements. For example, a "place" would include information, such as an address, a phone number, open hours of business, etc. This information does not necessarily apply to a "product" situation. A thin template just has a title, an image field and a description section. A thick (or more specific) template includes addition information.

A template may not be fixed, may be changed, and/or may have custom features. The templates may be configurable. A template may have information to customize: the size of an image; color of text; and allow for certain sections of text to include text and/or backgrounds with different color. For example, a displayed rating of above a predetermined amount for a certain game (e.g., Foursquare) may have a green color background. For Groupon, in a deal section, a current price may be displayed, which may be bold and highlighted in green, whereas a previous value may have a strike through the number and not have a green background.

In other examples, a simple template may display an image in a predetermined location and a title and description corresponding to the image. In this example, no control for color, size, and other specifics may be provided. Default templates may be stored, used and/or customized. Layouts of the templates may be modified. For example, an Eat24 template and a Yelp template may have a same default template, but the actual templates used may provide different presentations in terms of, for example, number, size, shape and/or color of shown stars and/or other differences. As another example the generic app may use a green circle for ratings while the Yelp app may use stars for ratings.

The configuration data disclosed herein may include a blob of data with configuration information for SDK. The configurations may map a content element or a data element into a layout element.

For different platforms, the layout of a UI of a user device may not be exchanged between user devices. However, in some examples, UI configurations may be exchanged between different platforms. This allows both platforms to understand the data being transferred between the user devices. This prevents SDKs of the user devices from requesting data objects, cards, and/or other information to render an app state and/or card.

In other examples, three template versions are stored depending on the platforms, such as native templates for each of the Android® and iOS platforms and a web template inside the web SDK. The templates may be across platforms, but the actual implementation may be in a specific code corresponding to the particular platform of the corresponding user device. The templates may have native layouts. A pre-defined set of templates may be stores and have default configurations for the native layouts. The configurations sent across platforms may include only content and map to a layout or include special instructions. For example, a default image size may be 72×72, but a JSON blob may indicate displaying the image as 72×110.

The templates may have unique IDs for each layout element. For instance, an image field in the content from Yelp® may be called a "Thumb Nail". A code instruction may state insert "Thumb Nail" element from Yelp® in the image layout element. The configurations may be specific to a function URL and the corresponding function may be specific to an app. A configuration file including configuration data may be stored for each function. The configuration data may be the same or different across platforms. An example difference may be: for this function, the template ID is called "product" template in Android®; but in iOS®, the template ID maybe called "products" template or "product 1" template. If a name combination is correct across both platforms, then an entire instruction file may be reused.

In other examples, when JSON is used, certain features may be turned ON and OFF based on key value pairs. For example, when sharing an app state or card with device B, the configurations may disable a call button, because a data object may be sent from a mobile device (or device A) to a tablet device (device B) and a call is not appropriate. The SDK sends these/this configurations/logic in the JSON blob, which for instance, may instruct for this template a disable function call since the target app is on a tablet. The configuration/logic is different than actual executed Javascript® code. The configuration/logic may send features across platforms based on one or more conditions. Flags may be turned ON and OFF at a rendering time, when the corresponding user device is displaying a view.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for.

What is claimed is:

1. A method of rendering application state information or a card at a second electronic device, the application state information or the card being representative of a state of a first application executed on a first electronic device, the method comprising:
receiving, at a processor of the second electronic device, a first message including a uniform resource locator (URL) from the first electronic device, the URL specifying a server and the state of the first application executed on the first electronic device;
receiving a user input indicating a selection of a link for access information or the URL;
executing a second application that causes the processor to send a request to the server for the card, the card comprising a graphical representation of data in the state of the first application or a text format presenting reduced information shown in the state of the first application;
receiving, from the server in response to the request and via the second application, code for displaying the card or the application state information extracted from the state of the first application;
displaying, via the second application, the card or the application state information corresponding to the link;
selecting the card or the application state information; and
launching, via the processor, the first application at the second electronic device based on the link, such that the first application executed at the second electronic device is in the state of the first application as executed on the first electronic device.

2. The method of claim 1,
wherein the server is a web server,
wherein the execution of the second application causes the processor to send the request to the web server,
wherein the second application displays the application state information, and
wherein the application state information is selected.

3. The method of claim 2,
wherein the second application comprises a browser application, and
wherein the code comprises one or more of hypertext markup language code and JavaScript programming language code.

4. The method of claim 2,
wherein the second application comprises a native application other than a browser application, and
wherein the code comprises one or more of hypertext markup language code and native code.

5. The method of claim 2,
wherein the second application comprises a launcher application, and
wherein the application state information is displayed in a dedicated screen of the launcher application.

6. The method of claim 2, further comprising:
receiving a second message,
wherein the second message comprises an image extracted from the state of the first application.

7. The method of claim 6, further comprising:
receiving a third message,
wherein the third message comprises text extracted from the state of the first application.

8. The method of claim 2, further comprising:
extracting, via the second application and from the URL, a string indicating a name of the first application; and
determining, via the second application, that an application matching the string is installed on the second electronic device.

9. The method of claim 1,
wherein the server is a web server,
wherein the execution of the second application causes the processor to send the request to the web server,
wherein the second application displays the card, and
wherein the card is selected.

10. The method of claim 1,
wherein the request comprises a hypertext transfer protocol request,
wherein the hypertext transfer protocol request includes the URL,
wherein the card is based on a template for rendering the card and has an associated link,
wherein the template is populated with data from a card record and according to configuration data, and
wherein the card record matches the URL, the template and the configuration data.

11. The method of claim 10, wherein the hypertext transfer protocol request is transmitted from a web browser application executed on the second electronic device.

12. The method of claim 10,
wherein the hypertext transfer protocol request comprises a user agent string, and
wherein the link of the card is configured based on the user agent string.

13. The method of claim 10,
wherein the hypertext transfer protocol request comprises an operating system identifier, and
wherein the link of the card is configured based on the operating system identifier.

14. The method of claim 10,
wherein the hypertext transfer protocol request comprises a rendering method, and
wherein the template is created based on the rendering method.

15. The method of claim 10, wherein the card record further comprises instructions for accessing an application programming interface (API) via a remote API server in order to obtain additional application state information.

16. The method of claim 1, wherein the URL is formatted as the link selectable by a user of the second electronic device.

17. The method of claim 1, further comprising:
receiving a second message,
wherein the second message comprises an image representing the state of the first application executed on the first electronic device.

18. The method of claim 1, wherein the first message comprises text representing the state of the first application executed on the first electronic device.

* * * * *